US012331907B2

(12) United States Patent
Moreno et al.

(10) Patent No.: US 12,331,907 B2
(45) Date of Patent: Jun. 17, 2025

(54) LIGHT FIXTURE WITH EXPANDING COLLAR

(71) Applicant: Hunter Industries, Inc., San Marcos, CA (US)

(72) Inventors: Jesus Moreno, Chula Vista, CA (US); Darrin I. Schmuckle, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 18/767,709

(22) Filed: Jul. 9, 2024

(65) Prior Publication Data

US 2025/0020292 A1 Jan. 16, 2025

Related U.S. Application Data

(60) Provisional application No. 63/512,873, filed on Jul. 10, 2023.

(51) Int. Cl.
*F21S 8/02* (2006.01)
*F21V 21/04* (2006.01)

(52) U.S. Cl.
CPC .............. *F21S 8/022* (2013.01); *F21V 21/04* (2013.01)

(58) Field of Classification Search
CPC ................................ F21S 8/022; F21V 21/04
USPC .............................................. 362/153, 153.1
See application file for complete search history.

(56) References Cited

U.S. PATENT DOCUMENTS

| | | | |
|---|---|---|---|
| 3,104,064 | A | 9/1963 | Bellek |
| D209,416 | S | 11/1967 | Smith |
| 3,519,726 | A | 7/1970 | Ewing |
| 3,524,981 | A | 8/1970 | Auerbach |
| 3,679,886 | A | 7/1972 | Pizzey |
| D242,945 | S | 1/1977 | Moore |
| 4,180,850 | A | 12/1979 | Bivens |
| 4,290,094 | A | 9/1981 | Jensen |
| 4,874,991 | A | 10/1989 | Ruskin |
| 4,974,134 | A | 11/1990 | Bourne |
| 5,136,493 | A | 8/1992 | Straus et al. |
| 5,337,993 | A | 8/1994 | Hersman |
| 5,349,134 | A | 9/1994 | Russell |
| 5,599,091 | A | 2/1997 | Kira |
| D381,449 | S | 7/1997 | Metchear, III |
| 5,649,760 | A | 7/1997 | Beadle |
| 5,655,829 | A | 8/1997 | Lin et al. |
| D388,900 | S | 1/1998 | Metchear, III |
| 5,704,704 | A | 1/1998 | Reichard et al. |
| D393,089 | S | 3/1998 | Metchear, III |
| 5,800,053 | A | 9/1998 | Shen |
| 5,829,913 | A | 11/1998 | Puckett |
| 6,017,137 | A | 1/2000 | Suehiro |

(Continued)

FOREIGN PATENT DOCUMENTS

| | | | |
|---|---|---|---|
| CN | 100549500 | C | 10/2009 |
| CN | 201377739 | Y | 1/2010 |

(Continued)

*Primary Examiner* — Laura K Tso
(74) *Attorney, Agent, or Firm* — KNOBBE MARTENS OLSON & BEAR LLP

(57) ABSTRACT

An in-grade light assembly can include an inner housing assembly. The inner housing assembly can include a body and a collar configured to slidingly engage with the body so as to create an interference fit between the collar and an outer structure. The collar can include a base and a flexible portion. The flexible portion can be one or more fingers.

22 Claims, 21 Drawing Sheets

(56) References Cited

U.S. PATENT DOCUMENTS

| | | | |
|---|---|---|---|
| 6,135,624 | A | 10/2000 | Masters et al. |
| D442,312 | S | 5/2001 | Metchear, III |
| 6,266,250 | B1 | 7/2001 | Foye |
| D446,330 | S | 8/2001 | Metchear, III |
| 6,299,075 | B1 | 10/2001 | Koller |
| 6,357,892 | B1 | 3/2002 | Beadle |
| 6,386,729 | B1 | 5/2002 | Bober |
| 6,422,717 | B1 | 7/2002 | Beadle |
| 6,443,783 | B1 | 9/2002 | Beadle |
| 6,491,407 | B1 | 12/2002 | Beadle |
| 6,497,592 | B1 | 12/2002 | Beadle |
| 6,540,374 | B2 | 4/2003 | Kira et al. |
| 6,575,591 | B1 | 6/2003 | De Lany |
| 6,583,700 | B1 | 6/2003 | Beadle |
| 6,612,720 | B1 | 9/2003 | Beadle |
| 6,652,113 | B2 | 11/2003 | Tant |
| 6,752,516 | B1 | 6/2004 | Beadle |
| 6,779,907 | B2 | 8/2004 | Beadle |
| 6,786,622 | B1 | 9/2004 | Rice |
| 6,796,684 | B1 | 9/2004 | Beadle |
| 6,799,869 | B1 | 10/2004 | Beadle |
| 6,860,624 | B2 | 3/2005 | Hille et al. |
| 6,874,905 | B1 | 4/2005 | Beadle |
| 6,902,200 | B1 | 6/2005 | Beadle |
| 6,957,782 | B2 | 10/2005 | Clark et al. |
| 7,108,394 | B1 | 9/2006 | Swarens |
| 7,226,189 | B2 | 6/2007 | Lee et al. |
| 7,320,533 | B1 | 1/2008 | Beadle |
| 7,387,409 | B1 | 6/2008 | Beadle |
| D573,297 | S | 7/2008 | Beadle |
| 7,470,895 | B1 | 12/2008 | Cramer et al. |
| 7,520,644 | B2 | 4/2009 | Jordan et al. |
| 7,614,769 | B2 | 11/2009 | Sell |
| 7,712,925 | B2 | 5/2010 | Russell |
| 7,874,709 | B1 | 1/2011 | Beadle |
| 7,905,621 | B1 | 3/2011 | Hickman |
| 7,993,040 | B2 | 8/2011 | Beadle |
| D670,848 | S | 11/2012 | Reo |
| 8,360,621 | B2 | 1/2013 | Avila et al. |
| 8,390,207 | B2 | 3/2013 | Dowling et al. |
| 8,419,205 | B1 | 4/2013 | Schmuckle |
| 8,602,613 | B2 | 12/2013 | Pike et al. |
| 8,672,502 | B2 | 3/2014 | Hartman |
| 8,714,767 | B2 | 5/2014 | Sears |
| 8,783,916 | B2 | 7/2014 | Tyson et al. |
| 8,939,598 | B1 | 1/2015 | Schmuckle |
| 8,939,600 | B1 | 1/2015 | Beadle et al. |
| 9,213,361 | B1 | 12/2015 | Urban |
| 9,249,958 | B2 | 2/2016 | Schmuckle |
| 9,476,580 | B2 | 10/2016 | Treurniet et al. |
| 9,689,565 | B2 | 6/2017 | Fryzek |
| 9,784,440 | B2 | 10/2017 | Erdener et al. |
| D824,563 | S | 7/2018 | Sonneman |
| D826,446 | S | 8/2018 | Chami et al. |
| 10,077,894 | B2 | 9/2018 | Mjelde |
| 10,113,726 | B1 | 10/2018 | Veloskey et al. |
| 10,125,956 | B2 | 11/2018 | Veloskey et al. |
| D849,297 | S | 5/2019 | Deng |
| 10,288,267 | B1 | 5/2019 | Schmuckle et al. |
| D855,231 | S | 7/2019 | Huang |
| 10,464,469 | B2 | 11/2019 | Ekladyous |
| 10,605,438 | B2 | 3/2020 | Veloskey et al. |
| D882,142 | S | 4/2020 | Huang |
| 10,612,734 | B2 | 4/2020 | MacLeish |
| D900,372 | S | 10/2020 | Peng |
| 10,816,168 | B2 | 10/2020 | Zeman |
| 10,935,229 | B2 | 3/2021 | Gauthier |
| D916,346 | S | 4/2021 | Sharp et al. |
| 11,466,821 | B2 | 10/2022 | Zhang |
| 2001/0014021 | A1 | 8/2001 | Duff et al. |
| 2001/0033487 | A1 | 10/2001 | Crelin |
| 2001/0048056 | A1 | 12/2001 | Gauci |
| 2004/0100787 | A1 | 5/2004 | Harris |
| 2004/0120141 | A1 | 6/2004 | Beadle |
| 2004/0145899 | A1 | 7/2004 | Riebling |
| 2004/0246709 | A1 | 12/2004 | Hagen |
| 2005/0099802 | A1 | 5/2005 | Lai |
| 2005/0103378 | A1 | 5/2005 | Pu et al. |
| 2005/0135101 | A1 | 6/2005 | Richmond |
| 2005/0174774 | A1 | 8/2005 | Lunt |
| 2006/0114668 | A1 | 6/2006 | Hagen |
| 2006/0114680 | A1 | 6/2006 | Miller |
| 2006/0198129 | A1 | 9/2006 | Hagen |
| 2007/0008717 | A1 | 1/2007 | Flaherty |
| 2007/0091585 | A1 | 4/2007 | Hedman |
| 2007/0171655 | A1 | 7/2007 | Lai |
| 2008/0273333 | A1 | 11/2008 | Berns et al. |
| 2009/0040774 | A1 | 2/2009 | Avila et al. |
| 2009/0122564 | A1 | 5/2009 | Beadle |
| 2009/0154164 | A1 | 6/2009 | Hsu et al. |
| 2010/0084985 | A1 | 4/2010 | Woytowitz |
| 2010/0284173 | A1 | 11/2010 | Verjans et al. |
| 2011/0018448 | A1 | 1/2011 | Metchear, III et al. |
| 2011/0063849 | A1 | 3/2011 | Alexander et al. |
| 2011/0255293 | A1 | 10/2011 | Lipscomb et al. |
| 2011/0267834 | A1 | 11/2011 | Potucek et al. |
| 2011/0303764 | A1 | 12/2011 | Roth |
| 2012/0051068 | A1 | 3/2012 | Pelton et al. |
| 2012/0236547 | A1 | 9/2012 | Hartman |
| 2012/0250337 | A1 | 10/2012 | Pike et al. |
| 2012/0274219 | A1 | 11/2012 | Woytowitz et al. |
| 2012/0314429 | A1 | 12/2012 | Plunk |
| 2013/0063946 | A1 | 3/2013 | Preuschl |
| 2014/0099093 | A1 | 4/2014 | Johnson, Sr. et al. |
| 2014/0301066 | A1 | 10/2014 | Inskeep |
| 2014/0313775 | A1 | 10/2014 | Myers et al. |
| 2014/0362564 | A1 | 12/2014 | Giblett |
| 2015/0260385 | A1 | 9/2015 | Brynjolfsson |
| 2015/0369469 | A1 | 12/2015 | Vamberi |
| 2016/0003432 | A1 | 1/2016 | Sorensen et al. |
| 2016/0327258 | A1 | 11/2016 | Sloan |
| 2016/0377280 | A1 | 12/2016 | Acampora |
| 2017/0191631 | A1 | 7/2017 | Lentine et al. |
| 2017/0219188 | A1 | 8/2017 | Veloskey |
| 2017/0261842 | A1 | 9/2017 | Johnson, Sr. et al. |
| 2018/0313504 | A1 | 11/2018 | Eberts et al. |
| 2019/0101256 | A1 | 4/2019 | Hartman |

FOREIGN PATENT DOCUMENTS

| | | | |
|---|---|---|---|
| CN | 202177052 | U | 3/2012 |
| CN | 202675059 | U | 1/2013 |
| CN | 102192449 | B | 3/2013 |
| CN | 203384914 | U | 1/2014 |
| CN | 204153599 | U | 2/2015 |
| CN | 204300860 | U | 4/2015 |
| CN | 204300871 | U | 4/2015 |
| CN | 204420720 | U | 6/2015 |
| CN | 105135292 | A | 12/2015 |

SECTION C-C

SECTION E-E

SECTION F-F

SECTION B-B

SECTION D-D

LIGHT FIXTURE WITH EXPANDING COLLAR

CROSS-REFERENCE TO RELATED APPLICATION

This application claims benefit under 35 U.S.C. 119(e) to U.S. Provisional Patent Application No. 63/512,873, filed Jul. 10, 2023, the entire disclosure of which is hereby incorporated by reference herein in its entirety. Any and all priority claims identified in the Application Data Sheet, or any corrections thereto, are hereby incorporated by reference under 37 CFR 1.57.

BACKGROUND

Technical Field

The present invention relates to light fixtures, and more particularly, light fixtures designed for outdoor installation.

Description of the Related Art

Outdoor lighting is popular for security, aesthetic, safety, and other reasons. Various types of commercial landscape light fixtures are available to meet the particular needs of residential or commercial properties. These include path, down, deck, tree, spot, spread, and security light fixtures.

SUMMARY

In many installations and circumstances, it is desirable to utilize a light fixture that is reliable and easy to repair. This can be especially true in installation environments subject to rain or other environmental hazards. In some cases, a reliable and easy-to-repair light fixture can include an outer housing configured to receive an inner housing assembly. The inner housing assembly can be constructed to include many or most of the lighting and/or electrical components of the light fixture. In some cases, the inner housing assembly is interchangeable with other inner housing assemblies (e.g., replacement inner housing assemblies having varying lighting/power/operable features). The inner housing assembly can include structure configured to facilitate easy installation and removal of the body from the outer housing.

An aspect is directed to an in-grade light assembly that comprises an outer housing having a first end configured to be positioned at or below a ground level or wall surface when installed, a second end opposite the first end, a sleeve portion between the first end and the second end, the sleeve portion having an inner surface, and an outer housing axis extending through the first and second ends of the outer housing. The in-grade light assembly comprises an inner housing assembly having a body and a collar configured to slidingly engage with the body in a direction parallel to the outer housing axis so as to create an interference fit between a portion of the collar and the inner surface of the sleeve portion.

A variation of the aspect above is, wherein the body has an outer surface, and wherein the collar engages with the outer surface.

A variation of the aspect above is, wherein at least a portion of the outer surface has a tapering shape, and wherein the portion of the collar engages with the tapering shape.

A variation of the aspect above is, wherein the tapering shape decreases in a direction towards the first end.

A variation of the aspect above is, wherein the tapering shape decreases in a direction towards the second end.

A variation of the aspect above is, wherein when the collar slidingly engages with the body, a cross sectional size of the collar increases.

A variation of the aspect above is, wherein the collar further comprises a base, and wherein the portion of the collar is one or more fingers extending from the base, and wherein the one or more fingers slidingly engage with the body.

A variation of the aspect above is, wherein the interference fit is between the one or more fingers and the inner surface of the sleeve portion.

A variation of the aspect above is, wherein the one or more fingers comprise a contact surface, and wherein the interference fit is between the contact surface and the inner surface of the sleeve portion.

A variation of the aspect above is, wherein the inner housing assembly comprises one or more pressure screws configured to cause the collar to slidingly engage with the body.

A variation of the aspect above is, wherein rotation of the one or more screws causes the collar to slidingly engage with the body.

A variation of the aspect above, further comprises a cover configured to prevent access to the one or more pressure screws when the cover is secured to the body.

A variation of the aspect above is, wherein the body is configured to receive a light module, the light module being configured to emit light through the first end of the outer housing when the inner housing assembly is installed within the outer housing.

A variation of the aspect above is, further comprises a lens assembly connected to the body.

A variation of the aspect above is, wherein the lens assembly comprises at least one fastener aperture configured to align with at least one fastener aperture of the inner housing assembly when the lens assembly is connected to the inner housing assembly.

A variation of the aspect above is, wherein the collar is configured to move toward and away from the first end of the outer housing in response to user input to the one or more pressure screws when the inner housing assembly is installed within the outer housing.

An aspect is directed to a method of assembling an in-grade light assembly. The method comprises inserting an inner housing assembly into an open end of an outer structure having an outer structure axis, the inner housing assembly comprising a body and a collar and slidingly engaging the collar with the body in a direction parallel to the outer structure axis so as to create an interference fit between a portion of the collar and the outer structure.

A variation of the aspect above is, wherein slidingly engaging the collar with the body is caused by rotating one or more screws.

A variation of the aspect above is, wherein the collar comprises a base and one or more fingers, and wherein the interference fit is created between the one or more fingers and the outer structure.

A variation of the aspect above, further comprises securing a cover to the inner housing assembly so as to prevent access to the one or more screws.

An aspect is directed to an in-grade light assembly for installation into a structure that has an inner surface. The in-grade light fixture comprises a body and a collar configured to slidingly engage with the body so as to create an interference fit between the collar and the inner surface of the structure.

A variation of the aspect above is, wherein the body has an outer surface, and wherein the collar engages with the outer surface.

A variation of the aspect above is, wherein at least a portion of the outer surface has a tapering shape, and wherein the collar engages with the tapering shape.

A variation of the aspect above is, wherein when the collar slidingly engages with the body, a cross sectional size of the collar increases.

A variation of the aspect above is, wherein the collar comprises one or more fingers, and wherein the one or more fingers slidingly engage with the body.

A variation of the aspect above is, wherein the interference fit is between the one or more fingers of the collar and the inner surface of the structure.

A variation of the aspect above is, wherein the structure is a PVC pipe.

A variation of the aspect above is, wherein the structure is a conduit.

A variation of the aspect above is, wherein the structure is a cored-out hole.

A variation of the aspect above is, wherein the structure is a cored-out hole in a paver or concrete.

A variation of the aspect above is, wherein the structure is a hole in wood.

BRIEF DESCRIPTION OF THE DRAWINGS

The present disclosure is described with reference to the accompanying drawings, in which like reference characters reference like elements, and wherein.

DETAILED DESCRIPTION

Outdoor light fixtures are often exposed to environmental hazards such as moisture, temperature variants, dirt, wind, sunlight, and other hazards. Additionally, like many electrical devices, light fixtures often require routine and non-routine maintenance for a variety of reasons. For example, light engines, light bulbs, circuits, wiring, and other components of light fixtures may have limited service lives and may require replacement and/or repair. In some cases, one or more components of the light fixture may be consumable, while all or most of the remaining components are designed for long-term installation and use.

Repair and replacement of components in a light fixture, especially an outdoor light fixture, can be costly, as the maintenance services can require specially-trained technicians and may require complete or substantially complete replacement of the entire fixture. As such, it is desirable that the repair of light fixtures be simplified to both reduce the cost of repair and to expedite the process of repairing fixtures.

In-ground lights are sometimes referred to as "in-grade lights". In-Grade lights can provide desired lighting for applications such as landscaping, structural lighting, pathway lighting, or other applications where upward-directed light is desired. In-Grade lights can also be used in applications to provide downward-directed or sideways-directed light. In-Grade lights can be installed in many environments including, but not limited to, landscaping beds, concrete (e.g., walkways or driveways), and/or turf. In-Grade lights can have a low profile (e.g., extend very little or not at all in an upward direction from the ground). In-Grade lights can be flush with or (entirely or partially) recessed from an adjacent surface. In some applications, activities such as lawn mowing, walking, driving, pressure-washing, and/or other activities can be performed on and/or near in-grade lights without negatively impacting the integrity or performance of the light.

Figure 3:
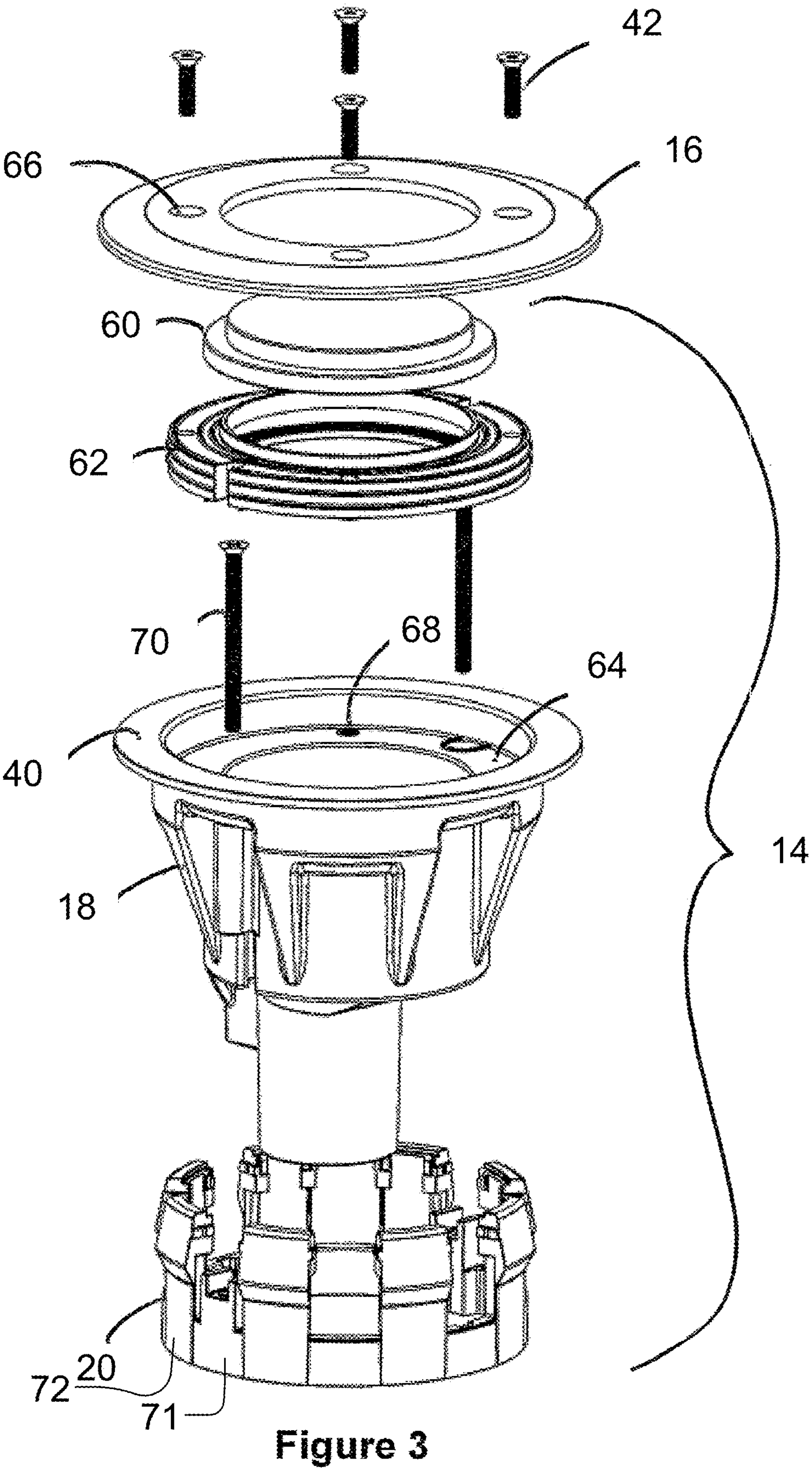
FIG. 3 is an exploded view of the inner housing assembly and cover from FIG. 2.

Embodiments of in-grade light fixtures 10 discussed herein provide structures which simplify installation and repair by, for example, employing an adjustable collar 20 (See FIG. 3). As described further below, at least a portion of the adjustable collar 20 flexes so as to change (e.g., increase/decrease) an overall size of the collar 20. In certain embodiments, the collar 20 is configured as a split ring or collet.

In certain embodiments, the collar 20 comprises a base 71 and a flexible portion. In the illustrated embodiments, the flexible portion of the adjustable collar 20 is one or more fingers 72. In the illustrated embodiments, the base 71 has a continuous annular shape and need not significantly flex or change shape. In contrast to the base 71, in certain embodiments, the one or more fingers 72 are configured to flex as further explained below. In certain other embodiments, the base 71 is configured as a split ring and may flex or change shape.

In certain embodiments, the one or more fingers 72 extend from the base 71 and are flexible relative to the base 71. In this way, in certain embodiments, the overall size of the collar 20 expands by flexing the one or more fingers 72 in a outward direction (e.g., away from an outer housing axis 28) relative to the base 71. Similarly, in certain embodiments, the overall size of the collar 20 contracts by flexing the one or more fingers 72 in an inward direction (e.g., towards the outer housing axis 28) relative to the base 71.

In certain embodiments, the in-grade light fixture 10 can include a hollow shaped outer housing 12 which is fixedly installed almost entirely below ground level. In certain embodiments, the in-grade light fixture 10 need not be installed into the outer housing 12 and instead can be installed into another structure that has a cylindrical inner shape. For example, in certain embodiments, the in-grade light fixture 10 can be installed into a PVC pipe, a conduit, a cored-out hole in a paver or concrete, a hole in wood, etc. In such an embodiment, the adjustable collar 20 would engage with an inner surface of the PVC pipe, conduit, cored-out hole in the paver or concrete, or the hole in the wood instead of the outer housing 12 illustrated in FIG. 1.

The light components which are part of an inner housing assembly 14 are installed within the outer housing 12. In certain embodiments, the adjustable collar 20 slidingly engages with a body 18 of the inner housing assembly 14 so as to vary or adjust an overall outer diameter or size of the inner housing assembly 14. For example, in certain embodiments, the one or more fingers 72 of the collar 20 engage with a tapered surface 74 of the body 18 so as to flex as the collar 20 is slid along the body 18. By adjusting the size of the inner housing assembly 14 (e.g., increasing or decreasing a diameter of the inner housing assembly 14), the user is able to create a desirable amount of interference fit between the inner housing assembly 14 and the outer housing 12. For example, the size of the inner housing assembly 14 can be made smaller than a size of the inside of the outer housing 12 (e.g., inner diameter 78) to case initial assembly by adjusting a position of the adjustable collar 20 relative to the body 18. Once the inner housing assembly 14 has the desired size, the inner housing assembly 14 can be initially placed in the outer housing 12. The size of the inner housing assembly 14 can then be increased by adjusting the position of the adjustable collar 20 relative to the body 18. For example, in certain embodiments, the size of the inner housing assembly 14 can be increased to create the interference fit between the outer surface of the inner housing assembly 14 and the inside of the outer housing 12 (e.g., inner diameter 78). The interference fit can fix or lock the inner housing assembly 14 in the outer housing 12.

In certain embodiments, the collar 20 can be moved along the body 18 (e.g., adjust the position of the collar 20 relative to the body 18) by one or more fasteners. For example, in certain embodiments, the one or more fasteners comprise one or more pressure screws 70. The one or more pressure screws 70 can be rotated with respect to the body 18 to cause the collar 20 to move along the body 18. In certain embodiments, this movement of the collar 20 along the body 18 causes the outer surface of the collar 20 as well as the overall size of the inner housing assembly 14 to expand or contract depending on the direction of the movement. In certain embodiments, the interference fit between the collar 20 and a wall (e.g., inner diameter 78) of the outer housing 12 can resist, inhibit or prevent movement of the inner housing assembly 14 in a direction parallel to an outer housing axis 28 with respect to the outer housing 12. In some embodiments, the outer housing 12 can include one or more surface features (e.g., grooves, protrusions, etc.) configured to increase a degree of the interference between the collar 20 and the wall of the outer housing 12. The one or more surface features can be disposed at the location(s) where the contact occurs between collar 20 and the outer housing 12. The one or more surface features can be arrange along the longitudinal length of the outer housing 12 so as to provide multiple locations or depths relative to the outer housing 12 for fixing or locking the inner housing assembly 14.

In the illustrated embodiment, the collar 20 has an annular shape. Of course the shape of the collar 20 is not limited to the illustrated shape and can have any other shape (e.g., square, elliptical, rectangular, etc.). The collar 20 can have an inner shape that does not match the shape of the body 18 so long as the collar 20 can engage with the body 18. In certain embodiments, an outer surface of the collar 20 need not have the same shape as the inner surface of the outer housing 12 so long as the collar can engage with the outer housing 12. In certain embodiments, the collar 20 has a first inner shape for engaging with the body 18 and a second outer shape for engaging with the outer housing 12. In certain embodiments, the first inner shape and the second outer shape are generally the same but need not be and can be different. For example, the collar 20 can have a first inner shape that is square for engaging with a square body 18 and a second outer shape that is cylindrical for engaging with a cylindrical outer housing 12.

In the illustrated embodiment, the collar 20 has eight sides or fingers 72 configured to contact the body 18 and the outer housing 12. In certain embodiments, each finger 72 contacts both the body 18 and the outer housing 12. For example, a first surface of the finger 72 can contact the body 18 while a second surface of the finger 72 can contact the outer housing 12. In certain embodiments, the first surface is on a side of the finger 72 that is opposite from the second surface. In certain embodiments, a first subset of the fingers 72 contact the body 18 and a second subset of the fingers 72 contact the outer housing 18. Of course the collar 20 is not limited to having the illustrated number of sides or fingers 72 and can instead have any number of sides or fingers (e.g., 4, 5, 6, 7, 9, 10, 11, 12, etc.) without deviating from the scope of this disclosure.

The collar 20 can be manufactured out of one or more materials (e.g., plastic, rubber, metal, etc.). In certain embodiments, the one or more materials can be selected so as to provide an adequate level of friction (e.g., prevent relative movement once installed) when in contact with the cylindrical shaped structure (e.g., outer housing 12, PVC pipe, conduit, cored-out hole in a paver or concrete, hole in wood, etc.). For example, the collar 20 can be made from ABS or another high hardness material if the contact between the ABS and the material of the cylindrical shaped outer structure provides an adequate level of friction to prevent relative movement (e.g., ABS and a very rough concrete or rock material). The amount of friction can be further adjusted by varying the size of the contact area between the collar 20 and the cylindrical shaped structure.

In certain embodiments, the collar 20 is made from more than one material. For example, in certain embodiments, the base 71 of the collar 20 is manufactured out of ABS and one or more contact surfaces 76 or regions of the fingers 72 (e.g., insert pads) of the collar 20 which contact the cylindrical shaped structure are manufactured from silicone or other high friction material to enhance their grip. In certain embodiments, the insert pads comprising the one or more contact surfaces 76 are over molded with the base 71 of the collar 20. In certain other embodiments, the insert pads are assembled to the collar 20.

Figure 1:
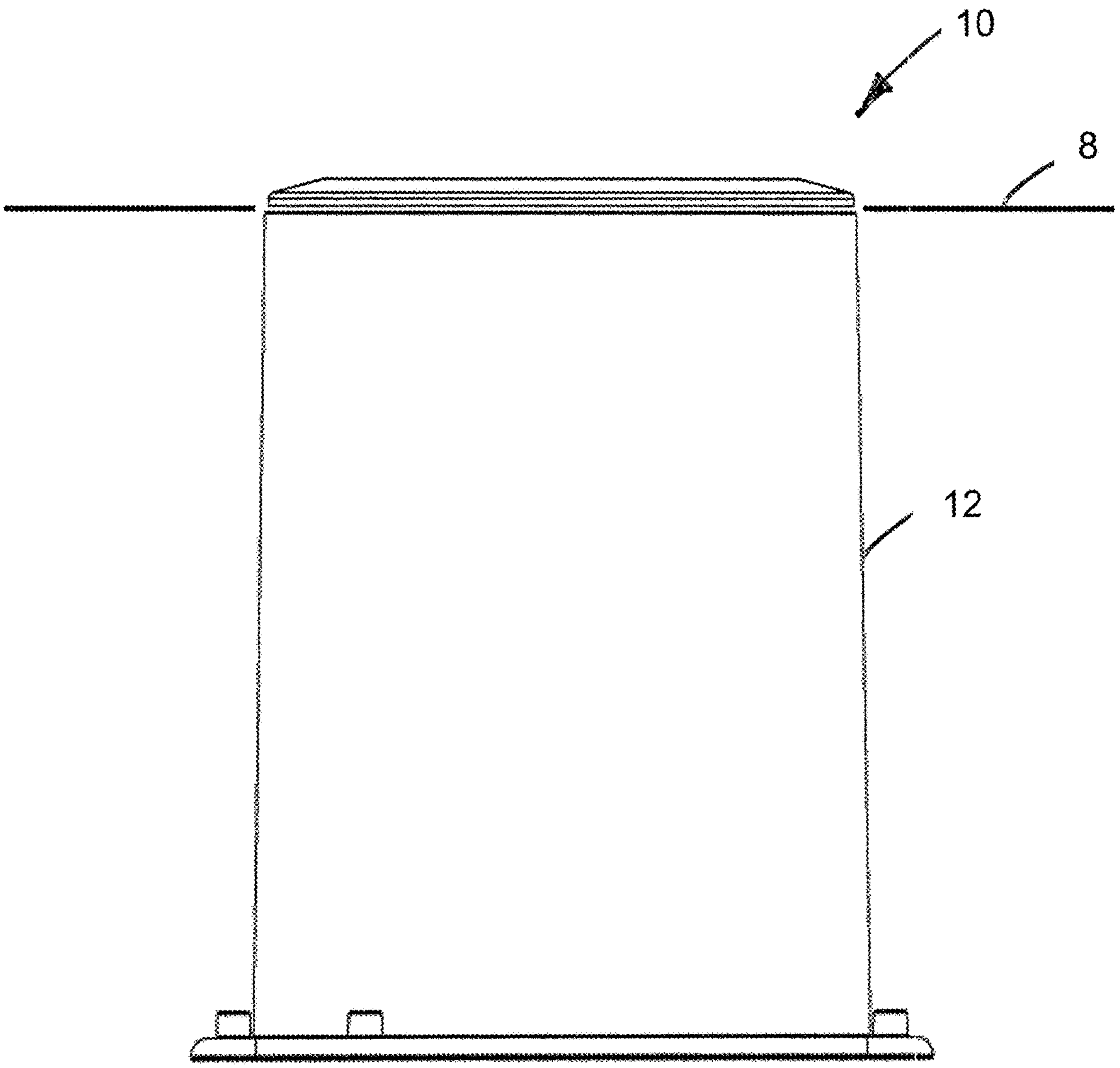
FIG. 1 is a side view of an in-grade light disposed almost entirely below ground level.
Figure 2:
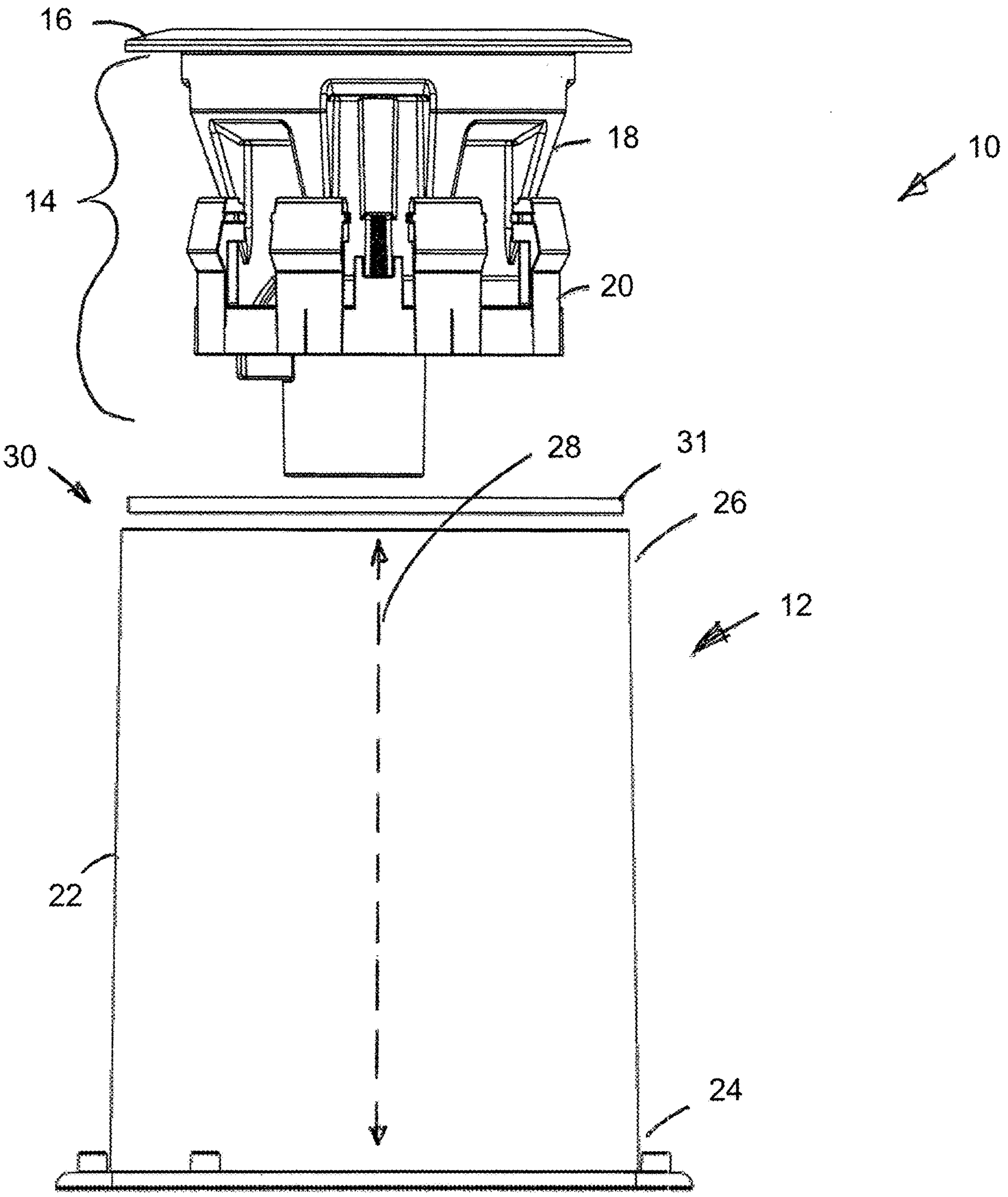
FIG. 2 is a view of an inner housing assembly removed from an outer housing of the in-grade light of FIG. 1.

FIG. 1 is a side view of an in-grade light 10 disposed almost entirely below ground level 8. FIG. 2 is a view of the inner housing assembly 14 removed from the outer housing

12 of the in-grade light 10 of FIG. 1. Because in-grade lights are often installed at least partially underground, they are especially susceptible to moisture, dirt, and other environmental hazards. In some cases, the position of the in-grade light 10 can make replacement and/or repair of parts within the light difficult due to the high risk of moisture ingress into the light and the difficulty of removing moisture from the light. Additionally, it can be difficult to adjust the direction (e.g., angle, tilt, etc.) of the light produced from the in-grade light 10.

An example of such an in-grade light 10 is illustrated in FIGS. 1 and 2. The in-grade light 10 can include one or more housings in which electrical and mechanical components are housed. For example, the in-grade light 10 can include the outer housing 12. The inner housing assembly 14 may be positioned at least partially within the outer housing 12 when the in-grade light 10 is assembled.

Figure 6:
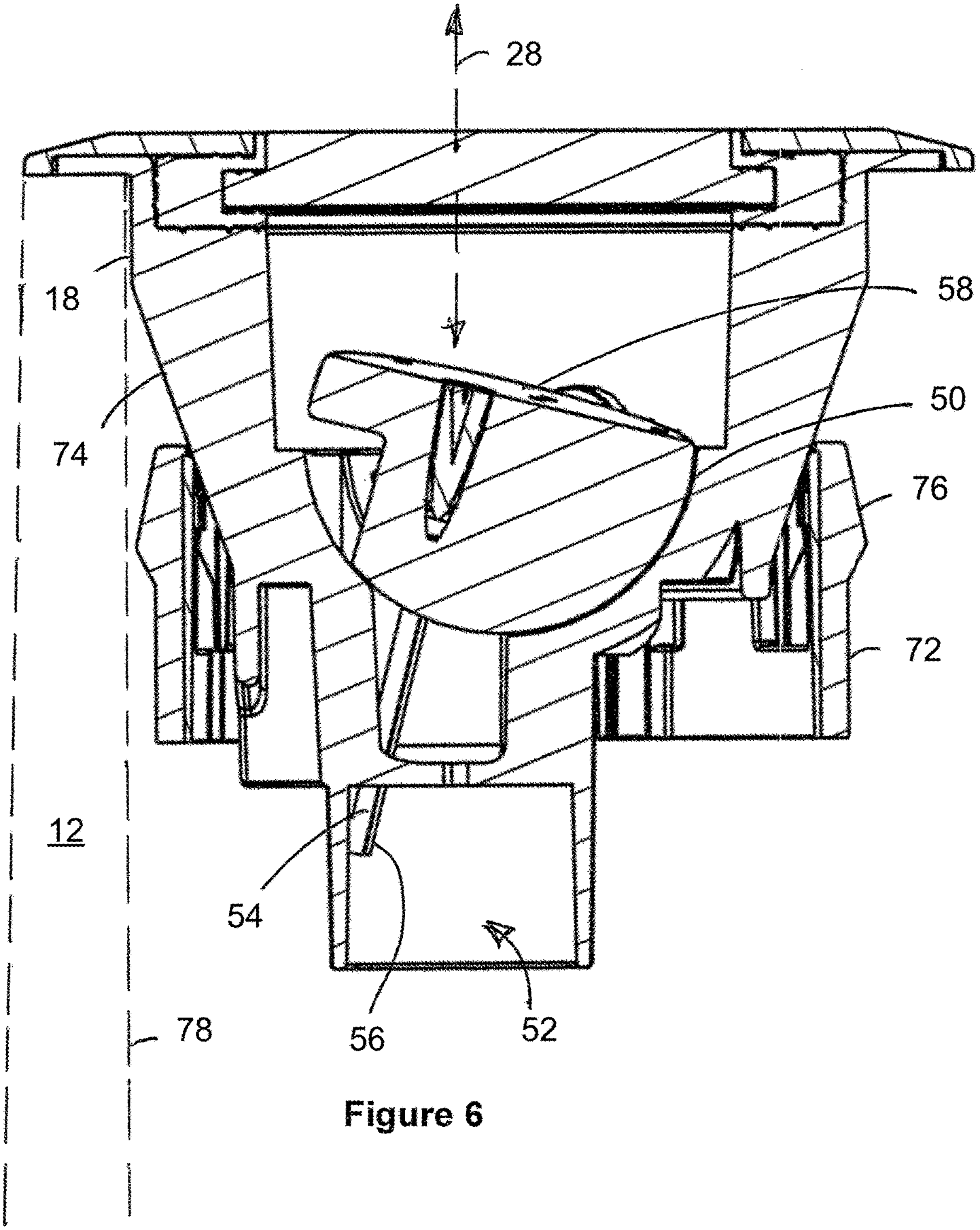
FIG. 6 is a side cross-section view of the inner housing assembly of FIG. 5 along the cut-plane 6-6 of FIG. 5.

The inner housing assembly 14 can include the body 18 and a module or cartridge 50 as illustrated in FIG. 6. In some embodiments, the body 18 can be configured to releasably connect to the outer housing 12 via the collar 20. For example, in the illustrated embodiment, adjustment of the collar 20 relative to the body 18 can fix and/or lock a position of the inner housing assembly 14 within the outer housing 12. In certain embodiments, the module or cartridge 50 can be tilted relative to the body 18 so as to adjust the direction (e.g., angle, tilt, etc.) of the light produced from the in-grade light 10. The in-grade light 10 can include a cover 16 configured to couple with one or both of the outer housing 12 and the inner housing assembly 14.

The body 18 can be manufactured out of one or more materials (e.g., plastic, rubber, metal, etc.). For example, in certain embodiments, the body 18 can be made from brass. In other embodiments, the body 18 is made from a composite plastic or any other material.

As will be discussed in more detail below, the in-grade light 10 can include one or more mechanisms or structures configured to facilitate fixing and/or locking the position of the inner housing assembly 14 within the outer housing 12. Fixing and/or locking the position of the inner housing assembly 14 within the outer housing 12 can include, for example, inhibiting movement of the inner housing assembly 14 relative to the outer housing 12 in at least one direction (e.g., longitudinal and/or rotational). In certain embodiments, the inner housing assembly 14 is inhibited from moving relative to the outer housing 12 in both longitudinal and rotational directions.

The outer housing 12 of the in-grade light 10 can include a sleeve portion 22. The sleeve portion 22 can have a first end (e.g., lower end) 24 and a second end (e.g., upper end) 26. In certain embodiments, the second end 26 can be open. In some embodiments, the first end 24 is closed. In certain embodiments, the outer housing 12 (e.g., the sleeve portion 22) is hollow or at least partially hollow. The outer housing 12 can have an outer housing axis 28 extending through one or both of the first and second ends 24, 26 of the sleeve portion 22.

The sleeve portion 22 can be connected to a connection portion 30. The connection portion 30 can be, for example, positioned at the second end 26 of the sleeve portion 22. In certain embodiments, the connection portion 30 can be configured to connect and/or support the inner housing assembly 14 and/or the cover 16. In certain embodiments, the connection portion 30 can comprise a gasket or seal 31.

In certain embodiments, the outer housing 12 can include one or more electrical ports. The one or more electrical ports can be configured to facilitate electrical connection between the interior of the outer housing 12 and the exterior of the outer housing 12. In certain embodiments, the one or more electrical ports can be positioned at or near the first end 24 of the sleeve portion 22.

In certain embodiments, the sleeve portion 22 can have a cylindrical or generally cylindrical shape. In some embodiments, one or more segments of the sleeve portion 22 have a different shape from one or more other segments of the sleeve portion 22. For example, one or more segments of the sleeve portion 22 can have a rectangular cross-sectional shape (e.g., as measured perpendicular to the outer housing axis 28), a triangular cross-sectional shape, an oval cross-section, and/or some other polygonal or curved cross-sectional shape.

In certain embodiments, the outer housing 12 can include a plurality of electrical ports. For example, the outer housing 12 can include two electrical ports. Three or more electrical ports are also contemplated. One or more of the electrical ports can be a stamped portion of the sleeve portion 22. The stamped portion can be punched out if or when the user (e.g., installation technician) decides to use the electrical port in question. Unused electrical ports can be left un-punched and impervious to fluid ingress or egress. The electrical ports may be molded into the outer housing 12, for example, when the outer housing 12 comprises plastic.

The electrical ports can include threaded portions configured to engage with electrical fittings. In some embodiments, the electrical ports are configured to engage with external electrical fittings in a fluid and/or liquid-tight manner.

The inner housing assembly 14 can be configured to couple and decouple with the outer housing 12. In some embodiments, the inner housing assembly 14 is configured to pass at least partially through the second end 26 of the outer housing 12 during coupling with and decoupling from the outer housing 12. In other embodiments, the inner housing assembly 14 need not pass through the second end 26 of the outer housing 12 during coupling with and decoupling from the outer housing 12.

In certain embodiments, the inner housing assembly 14 can be constructed such that, when assembled, the inner housing assembly 14 hermetically (e.g., in an air-tight, or water-tight manner) seals an interior of the inner housing assembly 14 from an exterior of the inner housing assembly 14.

FIG. 3 is an exploded view of the inner housing assembly 14 and cover 16 from FIG. 2. The inner housing assembly 14 (e.g., body 18) can include a mating structure 40. The mating structure 40 can be, for example, a shoulder, flange, indentation, protrusion, aperture, and/or some other structure configured to facilitate mating between the inner housing assembly 14 and the outer housing 12. In the illustrated embodiment, the mating structure 40 is a shoulder configured to be held (e.g., compresses, wedged, and/or secured) between the heads of one or more fastener 42 and the outer housing 12 when the one or more fasteners 42 are connected to the outer housing 12. In some embodiments, an intermediate structure such as a washer can be positioned between the heads of the fasteners 42 and the mating structure 40 to hold the mating structure 40. The fasteners 42 can be configured to mate with one or more outer apertures of the outer housing 12 (e.g., of the connection portion 30 of the outer housing 12).

The inner housing assembly 14 can include the body 18. In certain embodiments, the body 18 is hollow or at least partially hollow and is configured to receive the module or cartridge 50.

As shown in FIG. 6, the module or cartridge 50 can be configured to removably connect to the body 18. The cartridge 50 can include numerous structural features and components configured to house, maintain, or otherwise integrate with one or more electrical/lighting features and components. The cartridge 50 can be configured to facilitate removal, repair, installation, and/or other customization of the lighting features connected to the cartridge 50. For example, unlike standard "smart" light bulbs, the cartridge 50 can be configured such that one or more light engines, controllers, plugs, sensors, and/or other components may be replaced and/or swapped with other components.

The electrical/lighting components can include a light unit assembly 58. The light unit assembly 58 can be configured to generate light and direct that light with desired lighting characteristics (e.g., shape, intensity, direction, color, and/or other characteristics) from the cartridge 50. In some embodiments, the cartridge 50 includes one or more electrical connections (e.g., plugs) configured to electronically connect with complementary electronic features of the light 10.

The light unit assembly 58 can include a light engine configured to generate light. In some embodiments, the light unit assembly 58 includes a beam reflector and/or a beam director, each of which can be configured to alter the shape and/or intensity of the light generated by the light engine. The light engine can be or include a light emitting diode (LED) or an array of multiple LED's. In some embodiments, the light engine is a light bulb (e.g., an incandescent, fluorescent, halogen, or other bulb type). In some embodiments, the light engine includes one or more circuit boards and/or other electrical components. The light engine can be electronically connected to one or more sources of power and/or to one or more control units. For example, the light engine can include a plug or other electrical connector configured to mate with the driver and/or with some other component of the cartridge 50. The light unit assembly 58 can include one or more optical components. The optical component(s) can be, for example, one or more of a diffuser, a color filter, secondary lens, and/or some other optical component.

In some embodiments, the light unit assembly 58 can include a beam director. The beam director can include one or more protrusions configured to at least partially shroud and reflect the light emitted from the light engine. Many other light-directing shapes, including ellipses, polygons, and combinations thereof, can be produced by beam directors with appropriate protrusion arrangements. The cartridge 50 can be tilted or otherwise non-parallel to the body 18. Angular offset between the cartridge 50 and the body 18 can permit direction of the light from the cartridge 50 in a direction tilted from the outer housing axis 28.

One or more of the structural features of the body 18 can be configured to releasably mate with one or more features of the collar 20 to facilitate quick and easy installation and removal of the inner housing assembly 14 to and from the outer housing 12. In certain embodiments, the body 18 of the inner housing assembly 14 can be configured to expand an outer diameter of the collar 20 as the collar 20 slides in an upward direction relative the body 18 to create an interference fit between an outer diameter of the collar 20 and an inner diameter 78 of the outer housing 12. In certain embodiments, the body 18 of the inner housing assembly 14 can be configured to expand the outer diameter of the collar 20 as the collar 20 slides in a downward direction relative the body 18 to create the interference fit between the outer diameter of the collar 20 and the inner diameter 78 of the outer housing 12.

In certain embodiments, as one or more pressure screws 70 are tightened, the fingers 72 of the collar 20 slide on a tapered surface 74 of the body 18. As the fingers 72 slide, the fingers 72 are deflected in an outward direction towards the inner diameter 78 of the outer housing 12. For example, in certain embodiments, the one or more fingers 72 of the collar 20 engage with the tapered surface 74 of the body 18 so as to flex as the collar 20 is slid along the body 18. The amount of deflection increases until an interference fit or pressure between the outer diameter of the collar 20 and the inner diameter 78 of the outer housing 12 is achieved. The interference fit or pressure essentially locks or fixes the position of the inner housing assembly 14 within the outer housing 12.

In certain embodiments, the fingers 72 include one or more contact surfaces 76. In certain embodiments, the one or more contact surfaces 76 form the interference fit with the inner diameter 78 of the outer housing 12. In certain embodiments, the one or more contact surfaces 76 are made of a material that provides an adequate level of friction or grip when in contact with a surface defined by the inner diameter 78 of the outer housing 12. In certain embodiments, the one or more contact surfaces 76 have a surface roughness selected to enhance the interference fit or grip with the inner diameter 78 of the outer housing 12 when in contact with the outer housing 12.

In certain embodiments, loosening of the fasteners (e.g., the one or more pressure screws 70) allows the fingers 72 of the collar 20 to flex back in a direction away from the inner diameter 78 of the outer housing 12 as the fingers 72 of the collar 20 slide in a downward direction on the tapered surface 74 of the body 18. Once sufficiently loosened, the interference fit is removed or lowered so as to allow the inner housing assembly 14 to be lifted out of the outer housing 12 for replacement or service. The inner housing assembly 14 may also be rotated within the outer housing 12 for adjustment of the angle of the light beam without lifting the inner housing assembly 14 out of the outer housing 12. For example, once the fasteners are loosened, the inner housing assembly 14 may be rotated to the desired angle. The fasteners (e.g., the one or more pressure screws 70) can then be retightened creating the interference fit or pressure fit. Of course the tapered surface 74 could taper in either the upward or downward directions and still fall within the scope of this disclosure.

Figure 4:
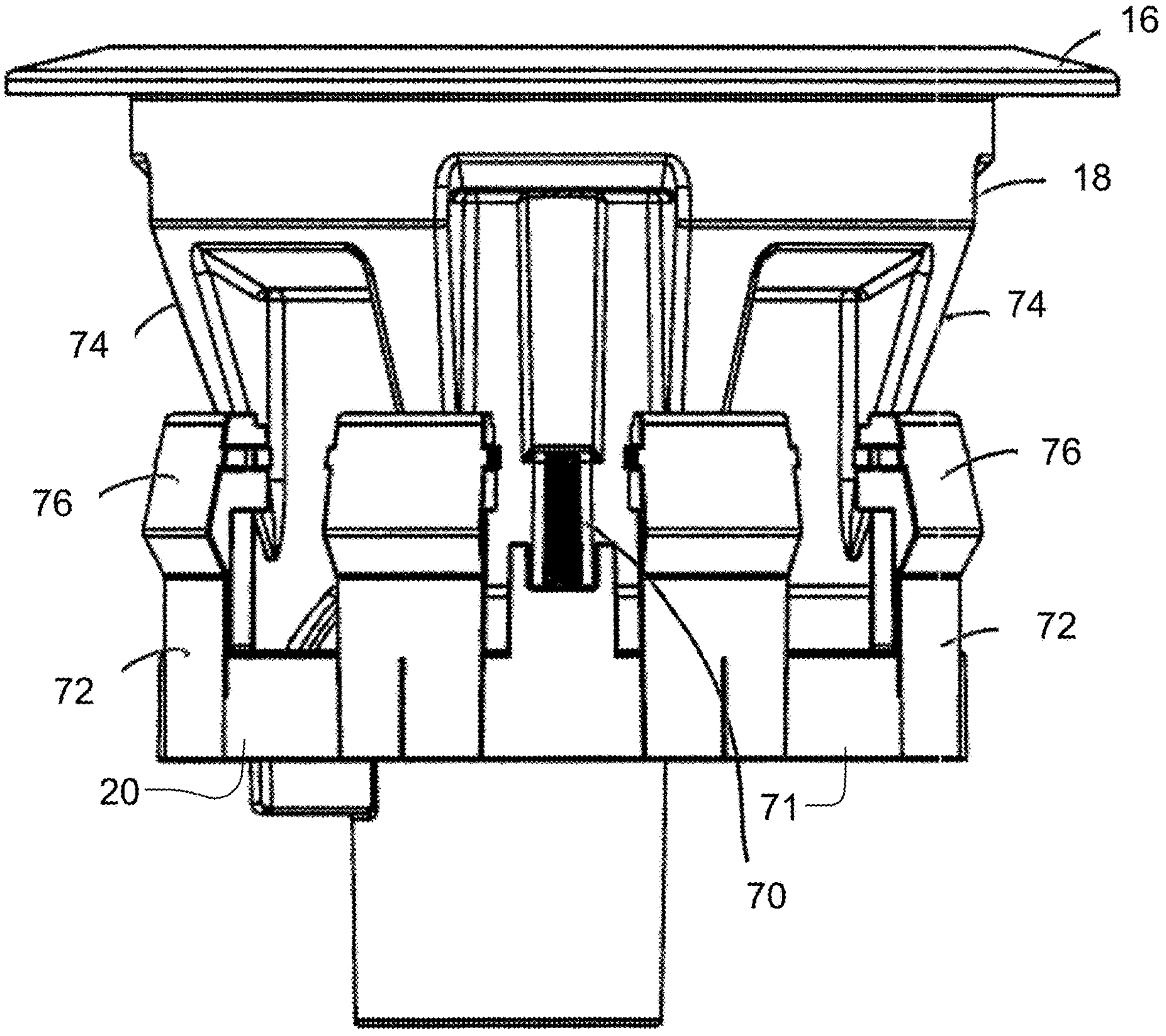
FIG. 4 is a side view of the inner housing assembly assembled to the cover.
Figure 5:
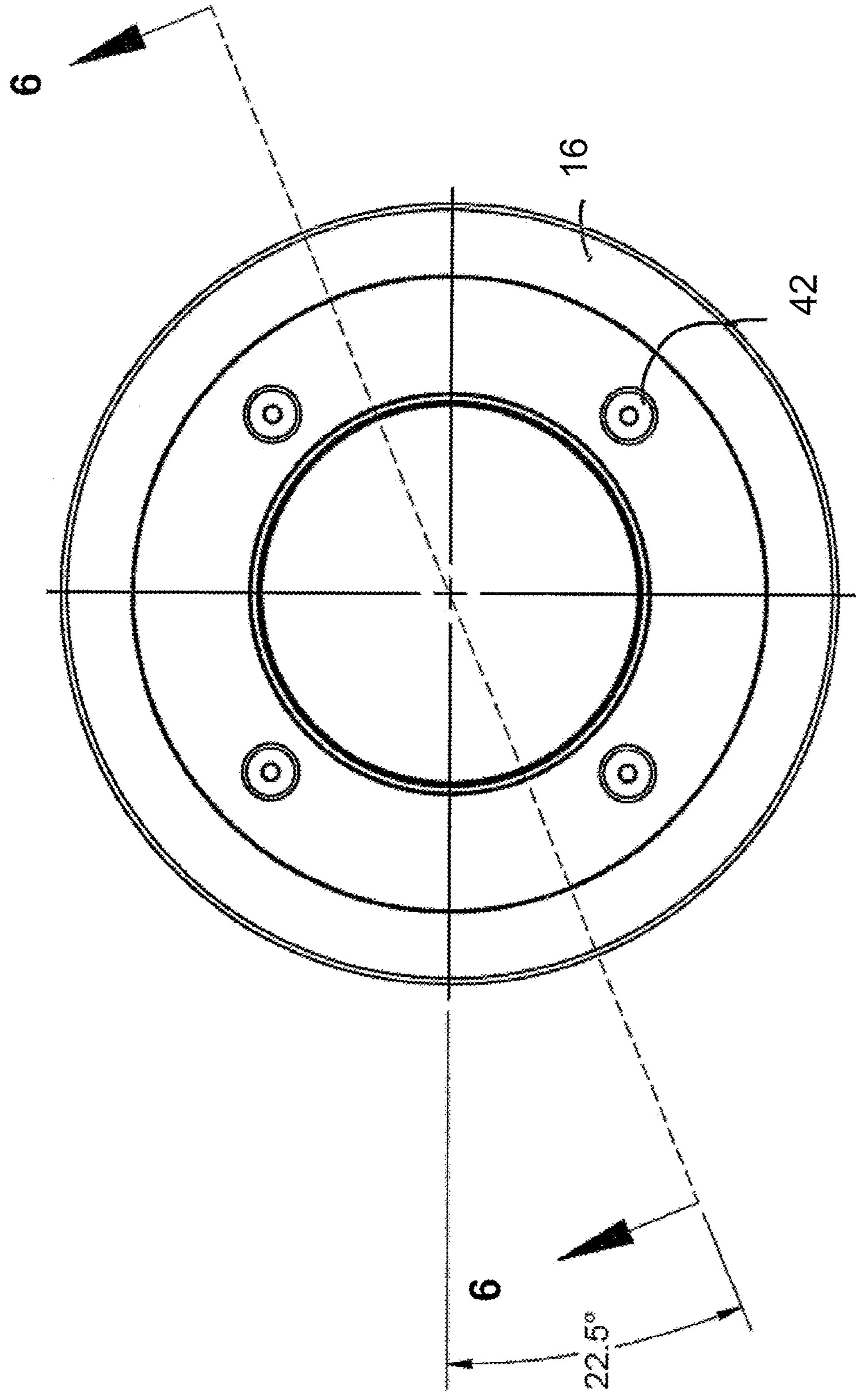
FIG. 5 is a top view of the inner housing assembly and cover.

FIG. 4 is a side view of the inner housing assembly 14 assembled to the cover 16. FIG. 5 is a top view of the inner housing assembly 14 and the cover 16. FIG. 6 is a side cross-section view of the inner housing assembly 14 of FIG. 5 along the cut-plane 6-6 of FIG. 5. The inner housing assembly 14 can include a tilting assembly 52. In certain embodiments, the tilting assembly 52 extends downward from the body 18. The tilting assembly 52 can be configured to facilitate user control over the tilt angle of the cartridge 50 with respect to the body 18.

The tilting assembly 52 can include one or more user input portions configured to receive user input. The tilting assembly 52 can further include one or more components configured to translate the user input to tilt the module or cartridge 50 in one or more directions. In certain embodiments, the tilting assembly 52 can include an adjusting shaft 54. The adjusting shaft 54 can include a user input portion 56 accessible from a first end of the shaft 54. In certain embodiments, the user can lock the tilt angle of the cartridge 50 once a desirable tilt angle is achieved.

When the outer diameter of the collar 20 is less than the inner diameter 78 of the outer housing 12, the inner housing assembly 14 can be assembled prior to inserting the inner housing assembly 14 into the outer housing assembly 12. In certain embodiments, once inserted into the sleeve portion 22 and resting on the upper end 26 of the outer housing 12, the outer diameter of the collar 20 can be expanded by tightening the one or more pressure screws 70. In this way, the body 18 of the inner housing assembly 14 can be configured to cause expansion of an outer diameter of the collar 20 as the collar 20 slides in an upward direction relative to the body 18. This relative movement can create the interference fit between the outer diameter of the collar 20 and the inner diameter 78 of the outer housing 12. For example, in certain embodiments, the one or more fingers 72 of the collar 20 engage with a tapered surface 74 of the body 18 so as to flex as the collar 20 is slid along the body 18. Loosening of the one or more pressure screws 70 allows the collar 20 to flex back in a direction away from the inner diameter 78 of the outer housing 12 as the collar 20 slide in a downward direction on the tapered surface 74 of the body 18.

In some cases, all or a portion of the inner housing assembly 14 can be disassembled while positioned in the outer housing 12. For example, in certain embodiments, the inner housing assembly 14 need not be removed entirely from the outer housing 12 to service components of the inner housing assembly 14.

In certain embodiments, a lens 60 can be installed on the body 18 to seal an interior of the inner housing assembly 14. For example, the lens 60 can be installed on the inner housing assembly 14 using fasteners, detents, friction fittings, or other releasable connection methods or structures.

In some embodiments, the inner housing assembly 14 includes a lens seal or gasket 62. The lens seal 62 can have, for example, an annular shape and be sized to engage with a portion of the body 18. For example, the lens seal 62 can be configured to engage with a seal groove 64 of the body 18.

The cover 16 can be configured to connect to the body 18 and/or the outer housing 12. For example, the cover 16 can include one or more apertures 66 configured to receive one or more fasteners 42. The one or more apertures 66 can be distributed to align with one or more inner apertures 68 on the body 18. In certain embodiments, the one or more fasteners 42 can be inserted through the apertures 66, 68 of the cover 16 and body 18 and tightened to compress the gasket 62 between the lens 60 and the body 18.

In some embodiments, the gasket 62 includes one or more gaps or spaces in its perimeter. The spaces can be sized and/or positioned to facilitate user access to the collet pressure screws 70. For example, the spaces can be aligned in a longitudinal direction with the one or more pressure screws 70. In certain embodiments, installation of the cover 16 prevents access to the one or more pressure screws 70. Removal of the cover 16 allows the user to access the one or more pressure screws 70 so as to create, remove, or adjust the interference fit between the outer housing 12 and the inner housing assembly 14.

To remove the inner housing assembly 14 from the outer housing 12, the user may disconnect the one or more fasteners 42 from the outer housing 12 to access the one or more pressure screws 70. Loosening of the one or more pressure screws 70 diminishes or removes the interference fit or pressure sufficiently to allow the user to lift the inner housing assembly 14 from the outer housing 12. In certain embodiments, the one or more pressure screws 70 may be unthreaded from the collar 20 so as to remove the body 18 from the outer housing 12 while leaving the collar 20 in the outer housing 12. Alternatively, the one or more pressure screws 70 may be loosened to diminish or remove the interference fit but left threaded to the collar 20 so as to remove the body 18 and the collar 20 as an assembly from the outer housing 12.

In some embodiments, one or more electrical connections (e.g., plugs or other connections) between the inner housing assembly 14 and some other portion of the in-grade light 10 can be disconnected to completely remove the inner housing assembly 14 from the in-grade light 10.

To adjust the tilt of the module or cartridge 50, a user can remove the cover 16. Once removed, the user can rotate the cartridge 50 within the body 18 (e.g., about an axis or rotation parallel or substantially parallel to the outer housing axis 28) by hand or by use of a tool. Upon loosening or removing of the fasteners 42, the user can then rotate the cartridge 50 to different desired rotational position. In certain embodiments, the user can lock the tilt angle of the cartridge 50 once a desirable tilt angle is achieved.

Figure 7:
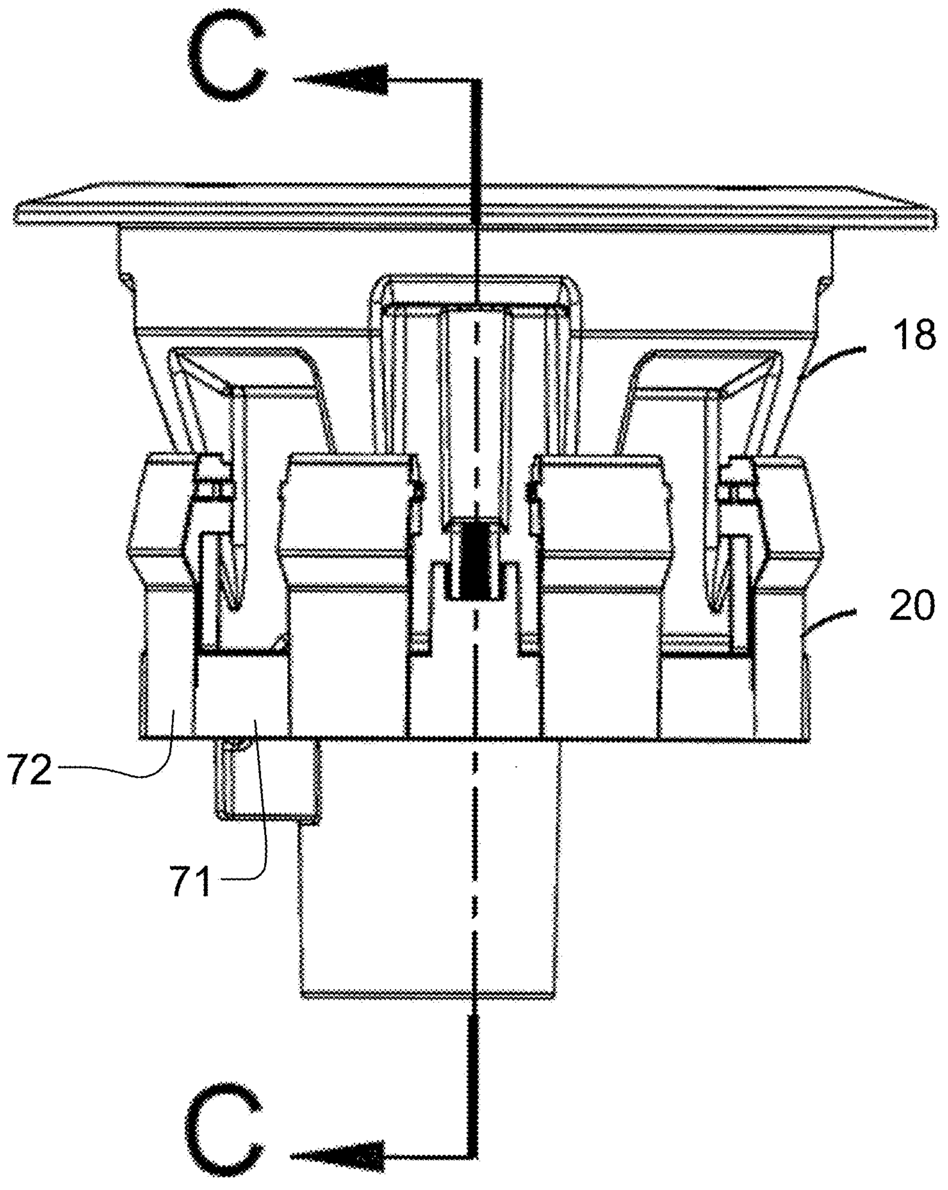
FIG. 7 is a side view of an embodiment of the inner housing assembly assembled to the cover.

FIGS. 7-13 are views of an embodiment of the inner housing assembly 14 assembled to the cover 16 which are similar to the embodiment illustrated in FIGS. 3-6. FIG. 7 is a side view of the inner housing assembly 14 assembled to the cover 16. Notably, the user can access the one or more pressure screws 70 (see FIG. 8) without having to remove the cover 16. As is illustrated in the embodiment of FIG. 3, the user is prevented from accessing the pressure collect screws 70 until the cover 16 is removed. In the embodiments illustrated in FIGS. 7-13, the interference fit or pressure between the outer diameter of the collar 20 and the inner diameter 78 of the outer housing 12 can be adjusted without having to remove the cover 16.

Figure 8:
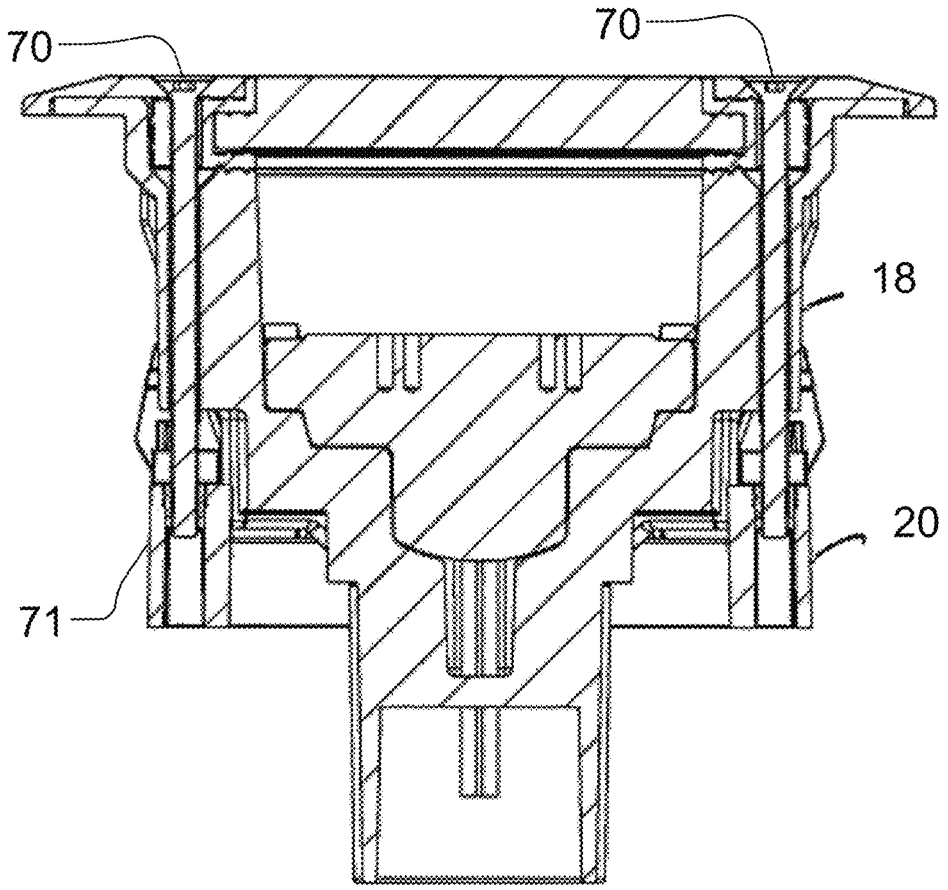
FIG. 8 is a cross-section view along lines C-C of FIG. 7.

FIG. 8 is a cross-section view that passes through the one or more fasteners along lines C-C of FIG. 7. In certain embodiments, the one or more fasteners comprise the one or more pressure screws 70. The one or more pressure screws 70 can be rotated with respect to the body 18 to cause the collar 20 to move along the body 18. In certain embodiments, this movement of the collar 20 along the body 18 causes the outer surface of the collar 20 as well as the overall size of the inner housing assembly 14 to expand or contract depending on the direction of the movement.

Figure 9:
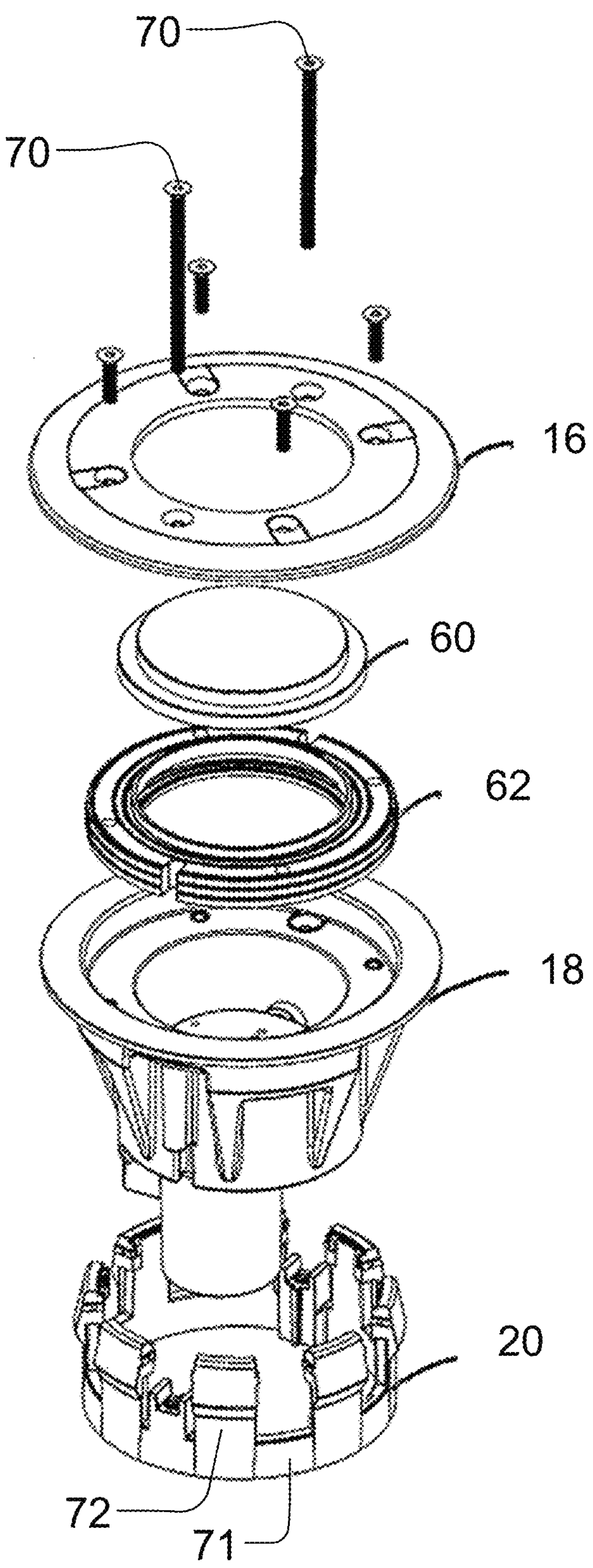
FIG. 9 is an exploded view of the inner housing assembly and cover from FIG. 7.

FIG. 9 is an exploded view of the inner housing assembly 14 and cover 16 from FIG. 7. The inner housing assembly 14 can include the body 18. In certain embodiments, the body 18 is hollow or at least partially hollow and is configured to receive the module or cartridge 50. In certain embodiments, the lens 60 can be installed on the body 18 to seal an interior of the inner housing assembly 14. In some embodiments, the inner housing assembly 14 includes the lens seal or gasket 62. The lens seal 62 can have, for example, an annular shape and be sized to engage with a portion of the body 18. The cover 16 can be configured to connect to the body 18 and/or the outer housing 12. In some embodiments, the gasket 62 includes one or more gaps or spaces in its perimeter. The spaces can be sized and/or positioned to facilitate user access to the collet pressure screws 70.

Figure 10:
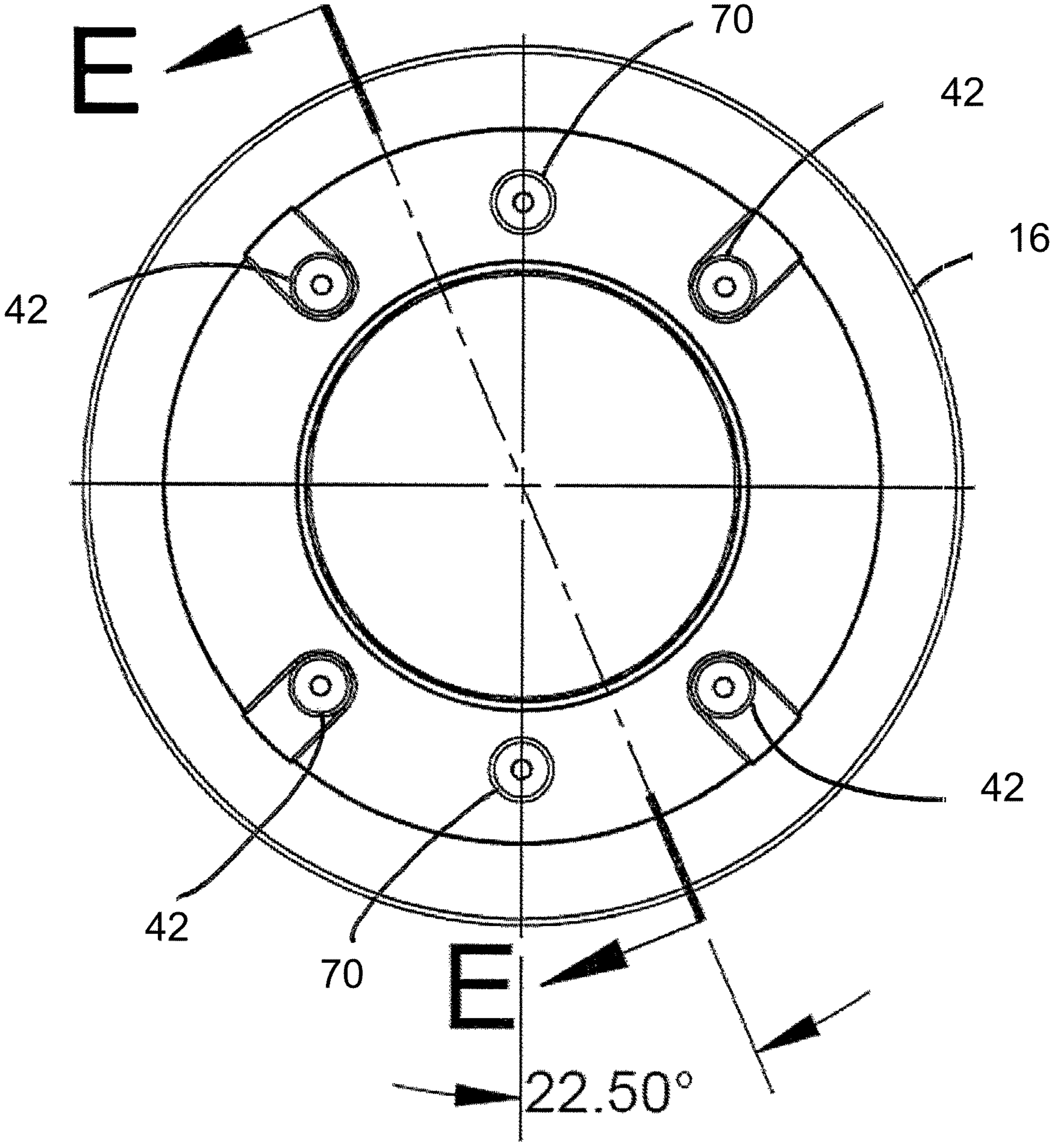
FIG. 10 is a top view of the inner housing assembly and cover from FIG. 7.
Figure 11:
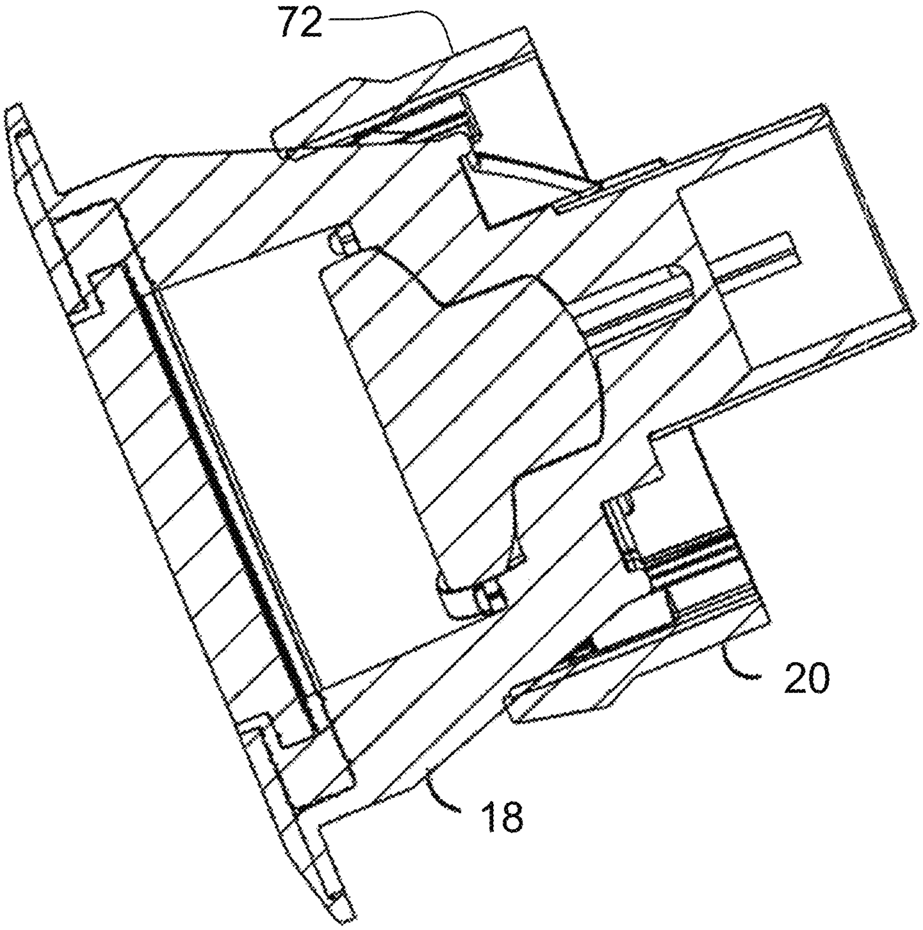
FIG. 11 is a cross-section view along lines E-E of FIG. 10.

FIG. 10 is a top view of the inner housing assembly 14 and cover 16 from FIG. 7. The user can access the one or more pressure screws 70 without having to remove the cover 16. FIG. 11 is a cross-section view along lines E-E of FIG. 10 that passes through the one or more fingers 72.

Figure 12:
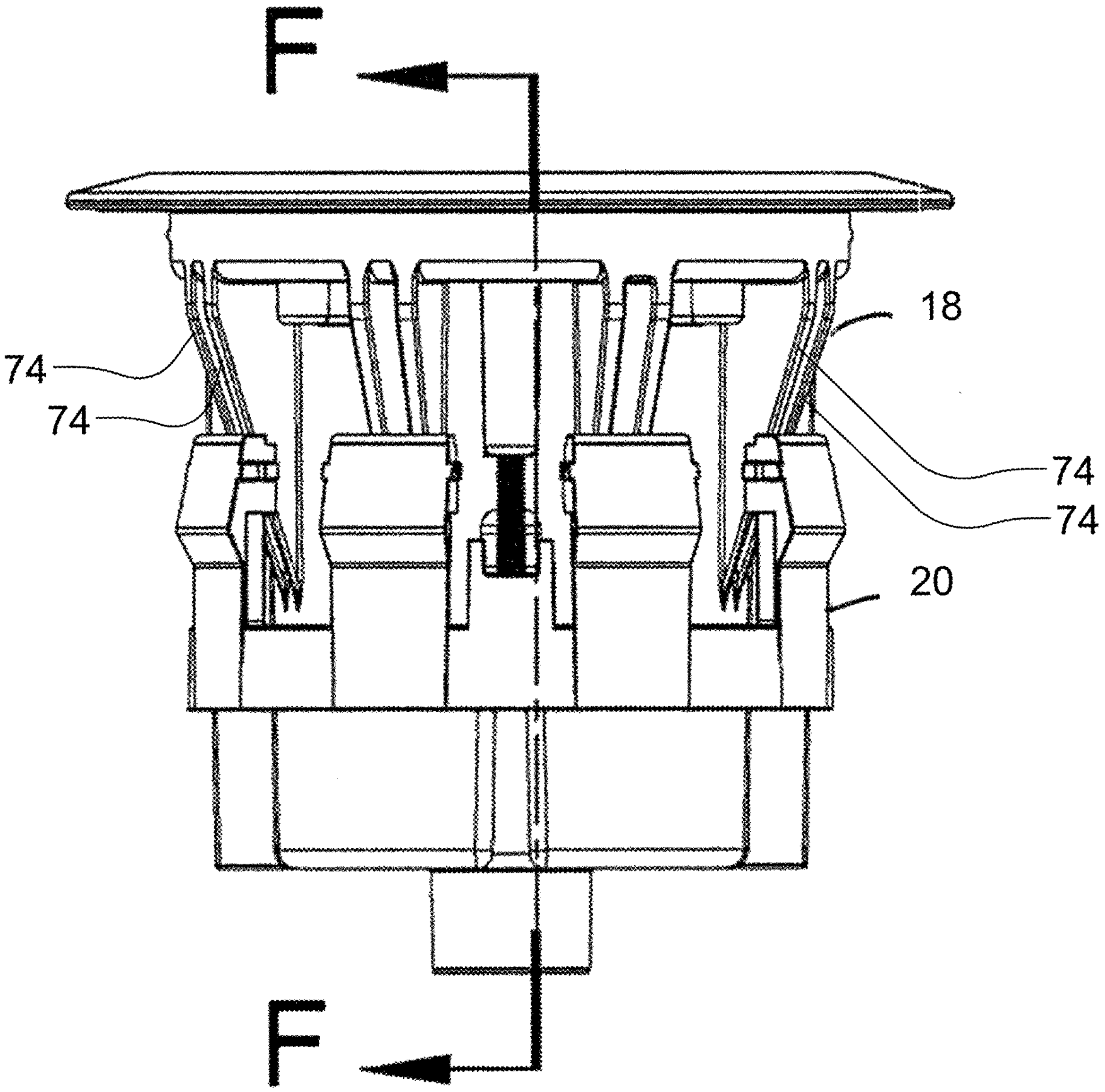
FIG. 12 is a side view of the inner housing assembly assembled to the cover.
Figure 13:
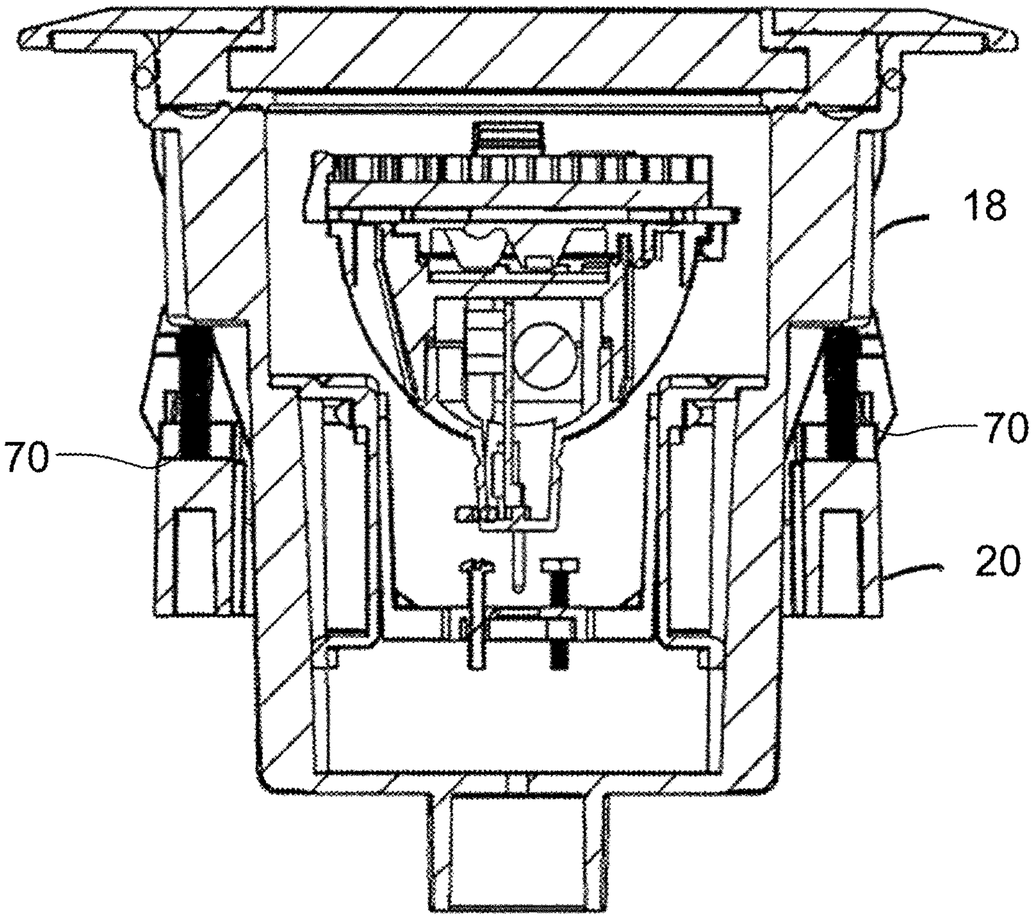
FIG. 13 is a cross-section view along lines F-F of FIG. 12.
Figure 14:
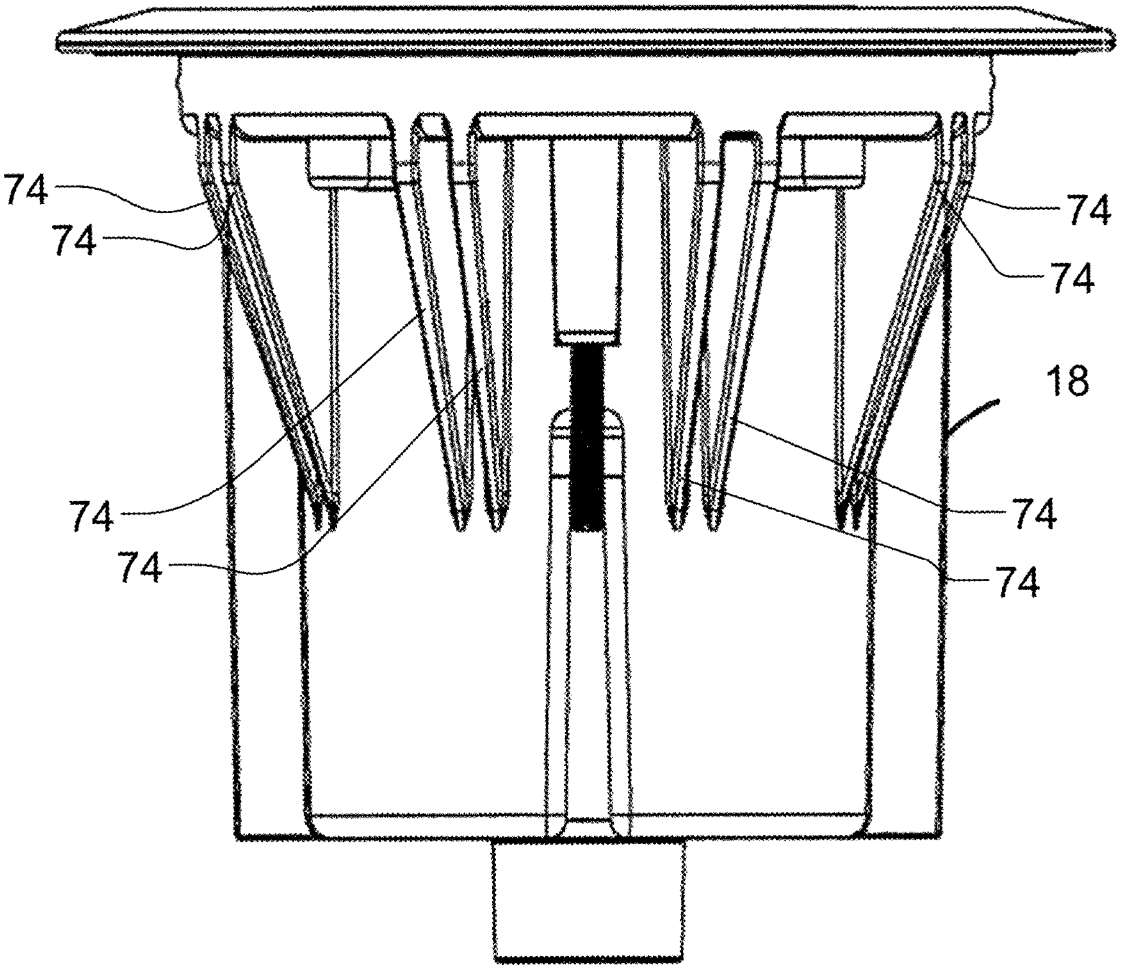
FIG. 14 is a side view of an embodiment of the body.
Figure 15:
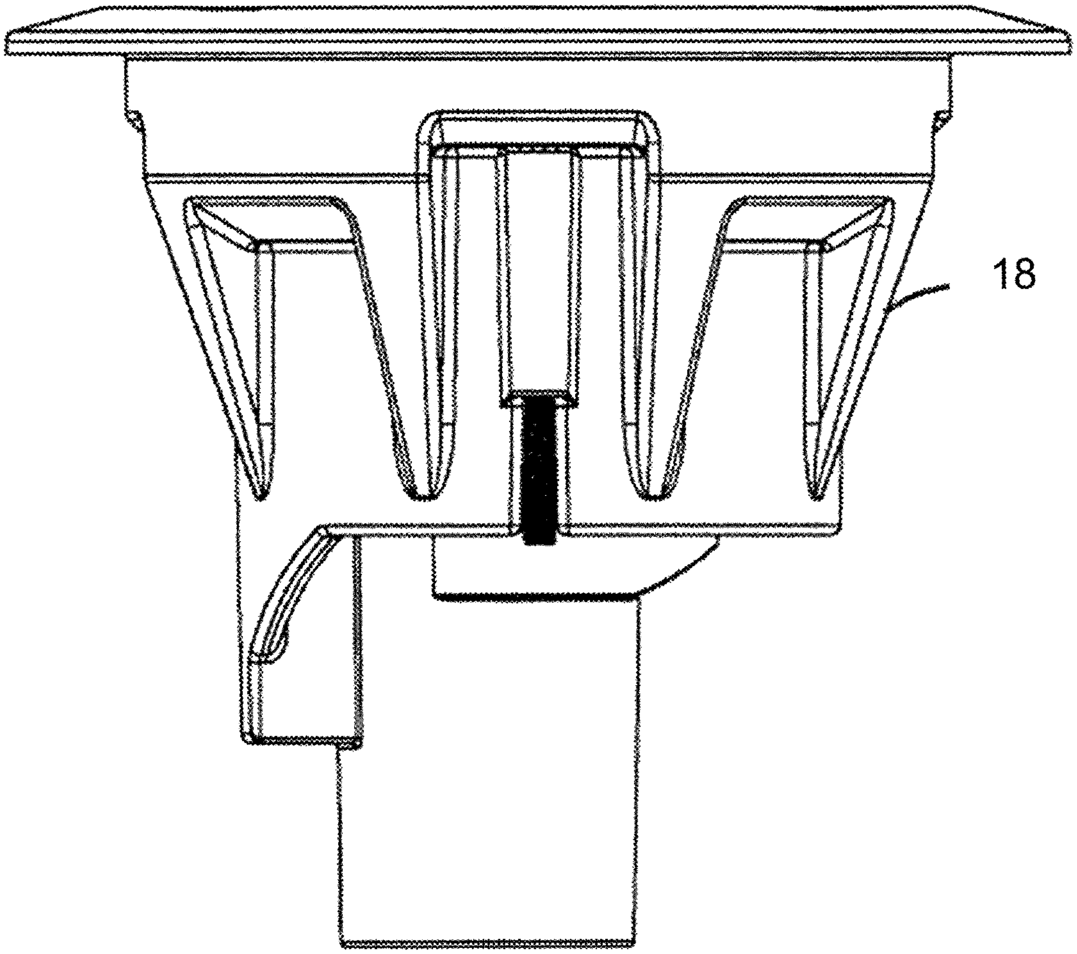
FIG. 15 is a side view of another embodiment of the body.
Figure 16:
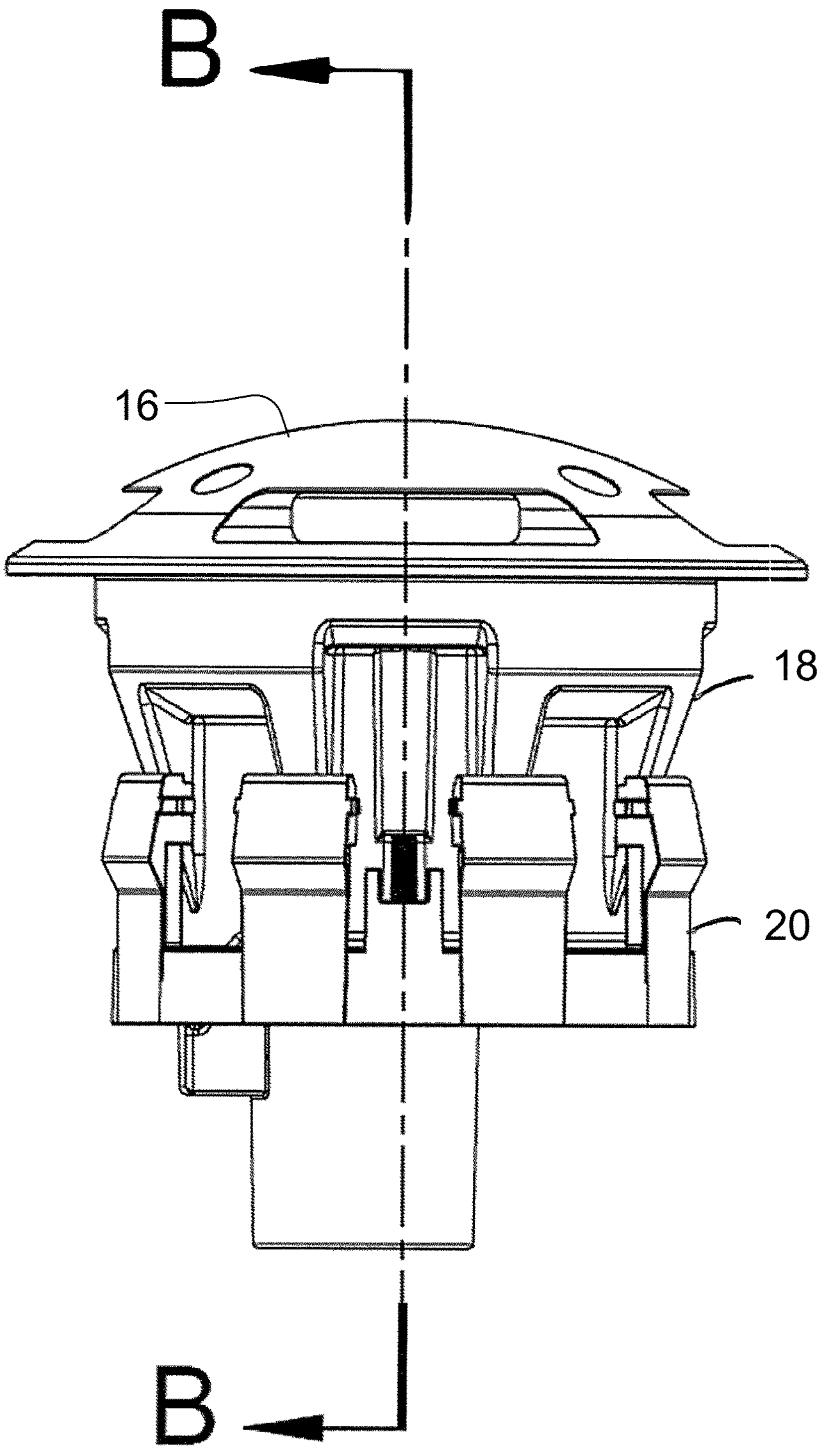
FIG. 16 is a side view of an embodiment of the inner housing assembly assembled to the cover.

FIG. 12 is a side view of another embodiment of the inner housing assembly 14 assembled to the cover 16. Notably, the body 18 includes additional tapered surfaces 74 having a reduced width when compared to the number and width of the tapered surfaces 74 illustrated in FIG. 4. The illustrated body 18 also has a longer or extended length relative to the body 18 illustrated in FIG. 3. Of course the disclosure is not limited to the illustrated numbers and shapes of the tapered surfaces 74 as well as a specific length of the body 18. FIG. 13 is a cross-section view along lines F-F of FIG. 12. FIG. 14 is a side view of the embodiment of the body 18 showing its extended length. FIG. 15 is a side view of another embodiment of the body 18 according to this disclosure that has a shortened length relative to the body 18 illustrated in FIG. 3.

Figure 17:
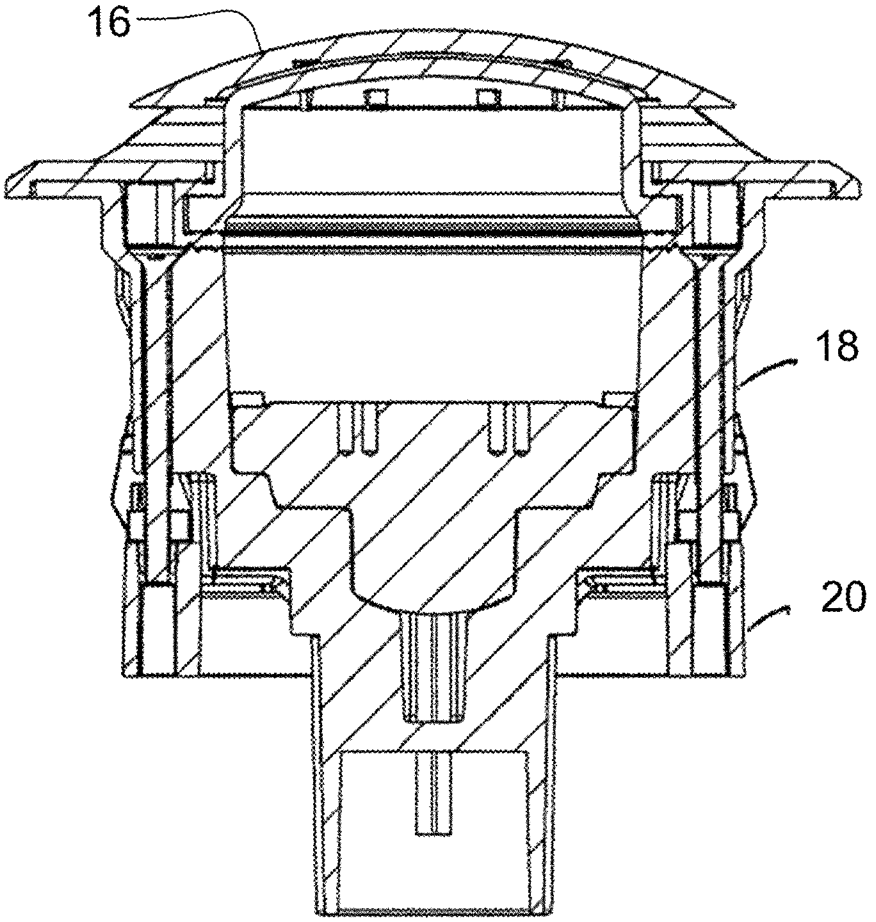
FIG. 17 is a cross-section view along lines B-B of FIG. 16.
Figure 18:
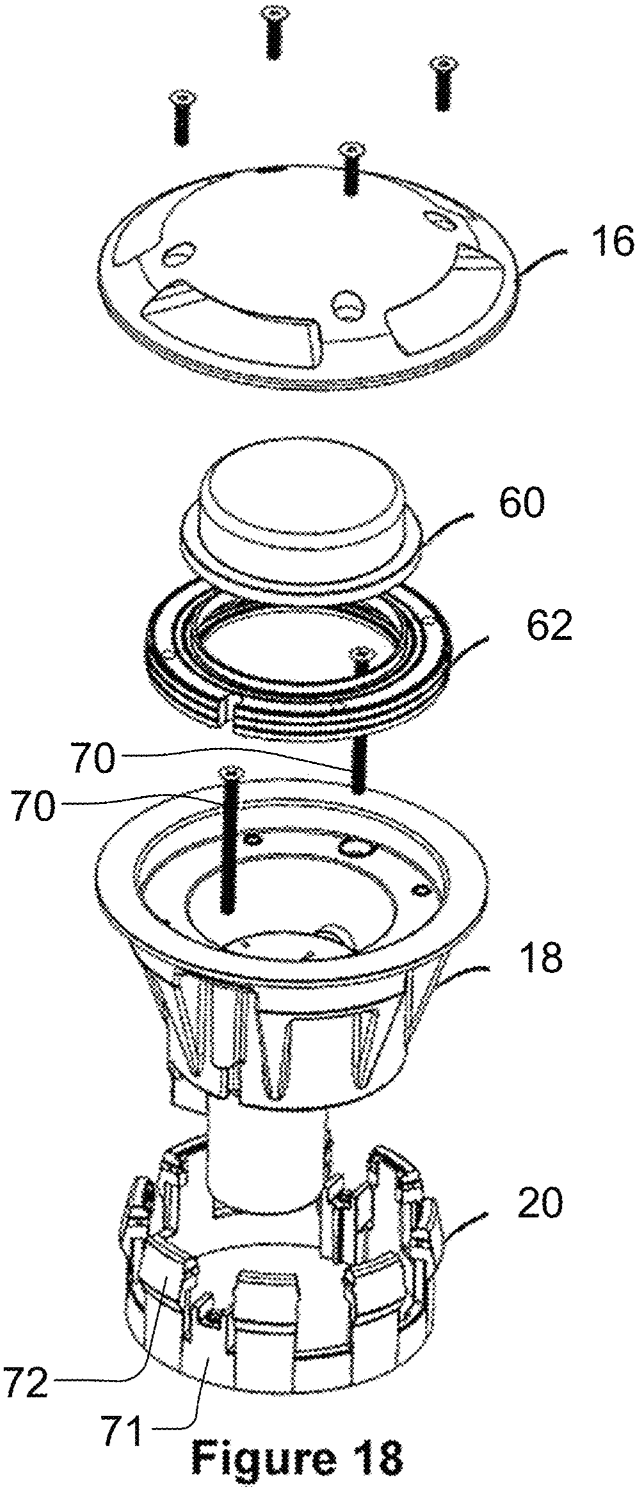
FIG. 18 is an exploded view of the inner housing assembly and cover from FIG. 16.
Figure 19:
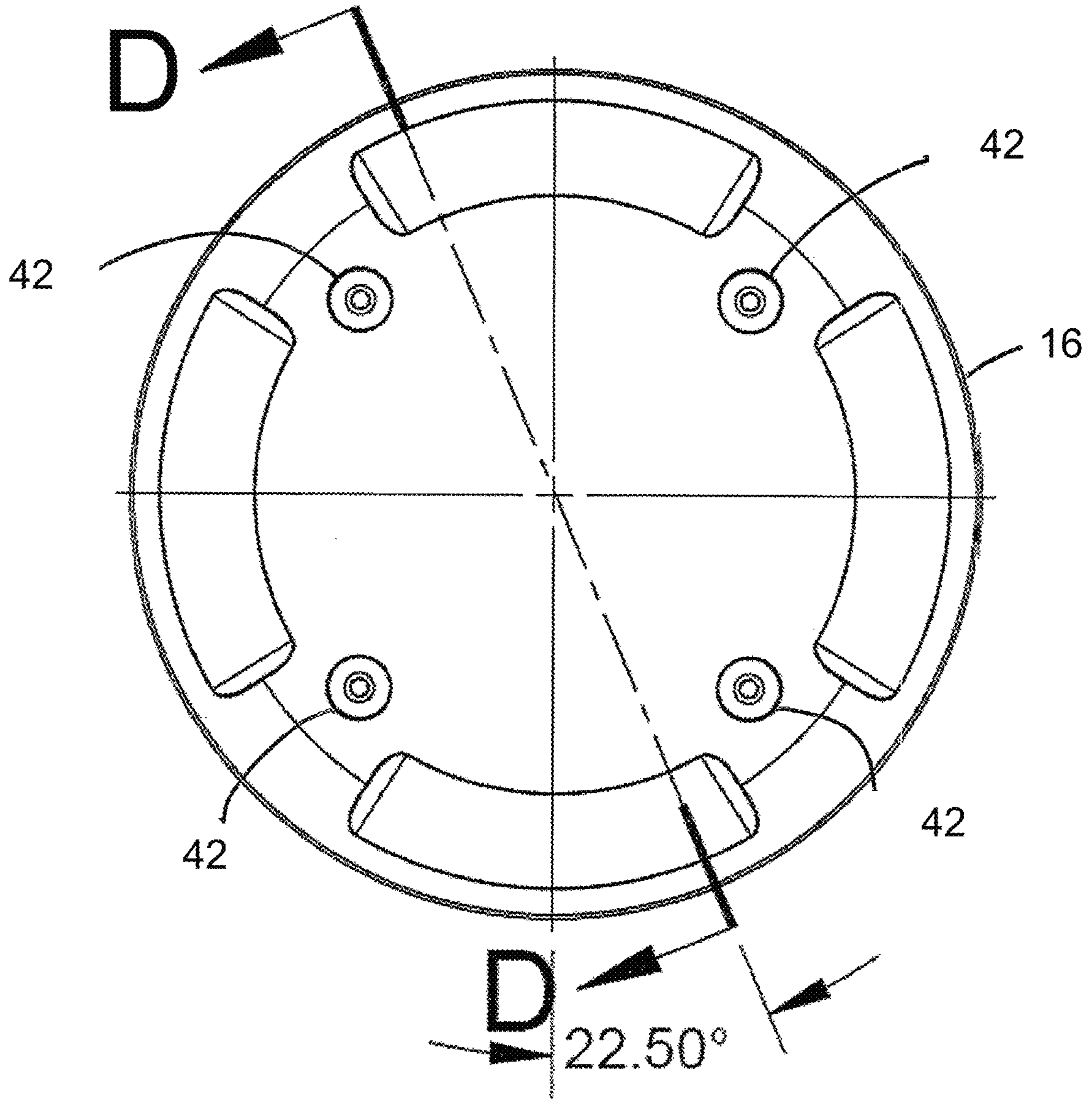
FIG. 19 is a top view of the inner housing assembly and cover from FIG. 16.
Figure 20:
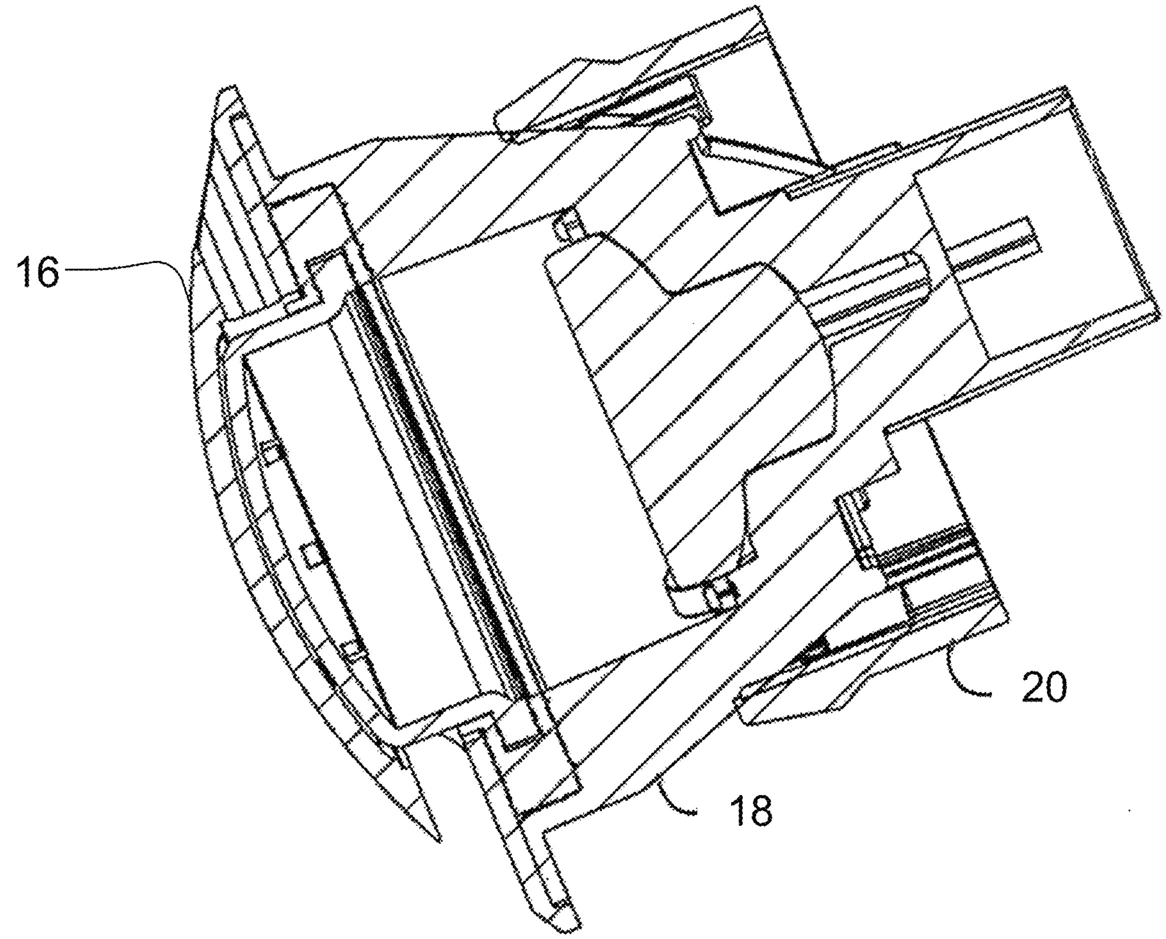
FIG. 20 is a cross-section view along lines D-D of FIG. 19.

FIGS. 16-20 are views of an embodiment of the inner housing assembly 14 assembled to the cover 16 which are similar to the embodiment illustrated in FIGS. 3-6 except the top surface of the cover 16 has a convex shape. FIG. 17 is a cross-section view along lines B-B of FIG. 16. FIG. 18 is an exploded view of the inner housing assembly 14 and the cover 16 from FIG. 16. FIG. 19 is a top view of the inner housing assembly 14 and the cover 16 from FIG. 16. FIG. 20 is a cross-section view along lines D-D of FIG. 19 and illustrates the convex shape of the cover 16.

Figure 21:
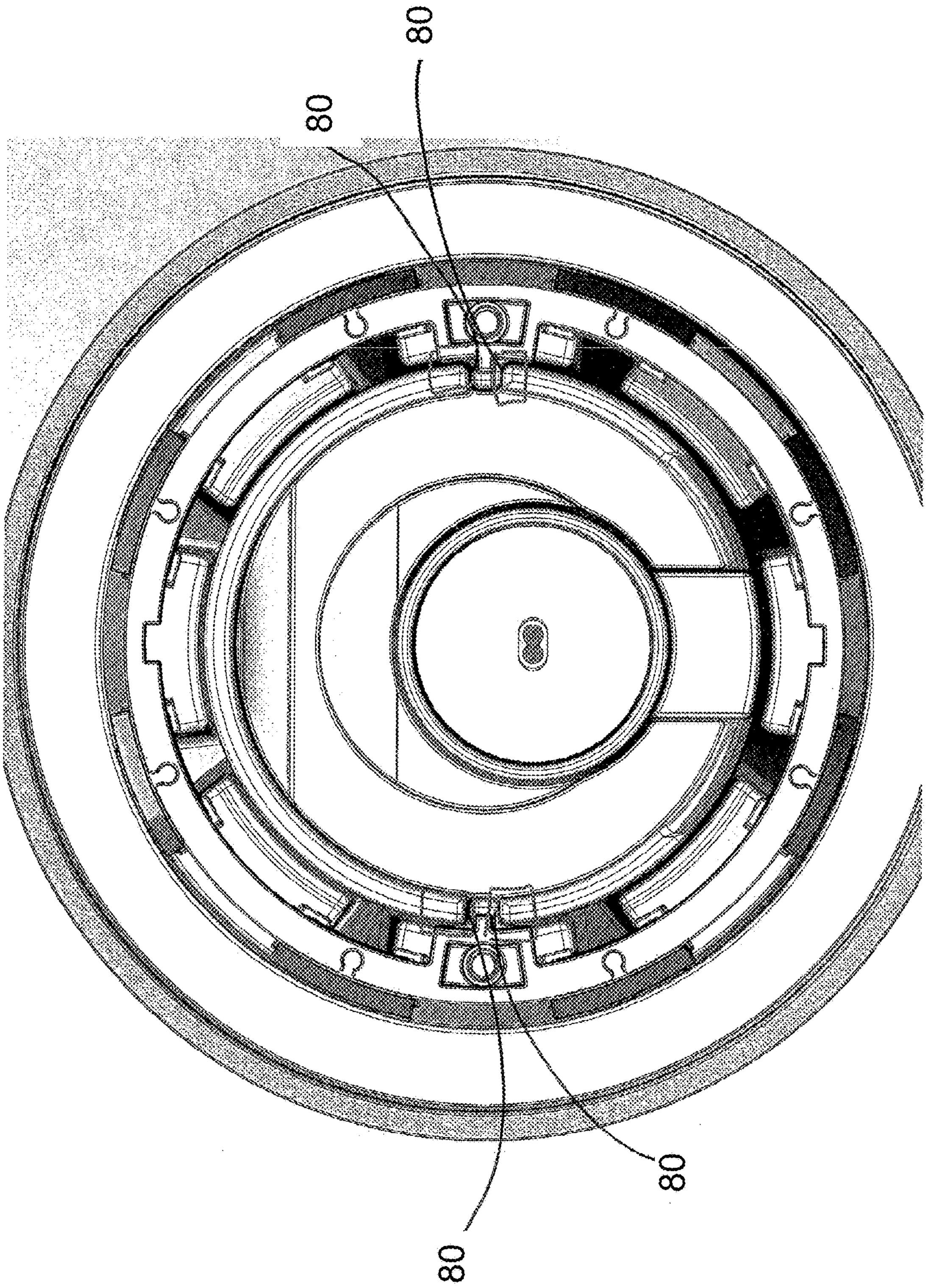
FIG. 21 shows two surfaces on each side where the one or more pressure screws are installed and which ride on the outside diameter of the body to force the collar straight during assembly to the body.

FIG. 21 is a downward plan view of the body 18 and shows two surfaces 80 on each side where the one or more pressure screws 70 are installed and which ride on the outside diameter of the body 18 to force the collar 20 straight during assembly to the body 18.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

What is claimed is:

1. An in-grade light assembly comprising:

an outer housing having:

a first end configured to be positioned at or below a ground level or wall surface when installed;

a second end opposite the first end;

a sleeve portion between the first end and the second end, the sleeve portion having an inner surface; and an outer housing axis extending through the first and second ends of the outer housing; and an inner housing assembly having:

a body; and a collar configured to slidingly engage with the body in a direction parallel to the outer housing axis so as to create an interference fit between a portion of the collar and the inner surface of the sleeve portion.

2. The in-grade light assembly of claim 1, wherein the body has an outer surface, and wherein the collar engages with the outer surface.

3. The in-grade light assembly of claim 2, wherein at least a portion of the outer surface has a tapering shape, and wherein the portion of the collar engages with the tapering shape.

4. The in-grade light assembly of claim 3, wherein the tapering shape decreases in a direction towards the second end.

5. The in-grade light assembly of claim 1, wherein when the collar slidingly engages with the body, a cross sectional size of the collar increases.

6. The in-grade light assembly of claim 1, wherein the collar further comprises a base, wherein the portion of the collar is one or more fingers extending from the base, and wherein the one or more fingers slidingly engage with the body.

7. The in-grade light assembly of claim 6, wherein the interference fit is between the one or more fingers and the inner surface of the sleeve portion.

8. The in-grade light assembly of claim 6, wherein the one or more fingers comprise a contact surface, and wherein the interference fit is between the contact surface and the inner surface of the sleeve portion.

9. The in-grade light assembly of claim 1, wherein the inner housing assembly comprises one or more pressure screws configured to cause the collar to slidingly engage with the body, and wherein rotation of the one or more screws causes the collar to slidingly engage with the body.

10. The in-grade light assembly of claim 9, further comprising a cover configured to prevent access to the one or more pressure screws when the cover is secured to the body.

11. The in-grade light assembly of claim 1, wherein the body is configured to receive a light module, the light module being configured to emit light through the first end of the outer housing when the inner housing assembly is installed within the outer housing.

12. The in-grade light assembly of claim 1, further comprising a lens assembly connected to the body, wherein the lens assembly comprises at least one fastener aperture configured to align with at least one fastener aperture of the inner housing assembly when the lens assembly is connected to the inner housing assembly.

13. The in-grade light assembly of claim 9, wherein the collar is configured to move toward and away from the first end of the outer housing in response to user input to the one or more pressure screws when the inner housing assembly is installed within the outer housing.

14. A method of assembling an in-grade light assembly, the method comprising:

inserting an inner housing assembly into an open end of an outer structure having an outer structure axis, the inner housing assembly comprising a body and a collar; and slidingly engaging the collar with the body in a direction parallel to the outer structure axis so as to create an interference fit between a portion of the collar and the outer structure.

15. The method of claim 14, wherein slidingly engaging the collar with the body is caused by rotating one or more screws.

16. The method of claim 14, wherein the collar comprises a base and one or more fingers, and wherein the interference fit is created between the one or more fingers and the outer structure.

17. The method of claim 15, further comprising securing a cover to the inner housing assembly so as to prevent access to the one or more screws.

18. An in-grade light assembly for installation into a structure that has an inner surface, comprising:

a body; and a collar configured to slidingly engage with the body so as to create an interference fit between the collar and the inner surface of the structure.

19. The in-grade light assembly of claim 18, wherein the body has an outer surface, and wherein the collar engages with the outer surface.

20. The in-grade light assembly of claim 19, wherein at least a portion of the outer surface has a tapering shape, and wherein the collar engages with the tapering shape.

21. The in-grade light assembly of claim 18, wherein the interference fit is between one or more fingers of the collar and the inner surface of the structure.

22. The in-grade light assembly of claim 18, wherein the structure is a PVC pipe, a conduit, a cored-out hole, a cored-out hole in a paver or concrete, or a hole in wood.

* * * * *